(12) United States Patent
Tachibana et al.

(10) Patent No.: US 10,960,761 B2
(45) Date of Patent: Mar. 30, 2021

(54) DISPLAY SYSTEM AND DISPLAY METHOD

(71) Applicant: Mitsubishi Electric Corporation, Tokyo (JP)

(72) Inventors: Atsuki Tachibana, Tokyo (JP); Reiko Sakata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/622,096

(22) PCT Filed: Jul. 5, 2017

(86) PCT No.: PCT/JP2017/024658
§ 371 (c)(1),
(2) Date: Dec. 12, 2019

(87) PCT Pub. No.: WO2019/008703
PCT Pub. Date: Jan. 10, 2019

(65) Prior Publication Data
US 2020/0180434 A1 Jun. 11, 2020

(51) Int. Cl.
*B60K 35/00* (2006.01)
*B60W 50/14* (2020.01)
*G06F 3/14* (2006.01)
*B60W 60/00* (2020.01)
*G05D 1/00* (2006.01)

(52) U.S. Cl.
CPC ............ *B60K 35/00* (2013.01); *B60W 50/14* (2013.01); *G06F 3/1423* (2013.01); *B60K 2370/166* (2019.05); *B60K 2370/167* (2019.05); *B60K 2370/172* (2019.05); *B60K 2370/175* (2019.05); *B60K 2370/52* (2019.05);
(Continued)

(58) Field of Classification Search
None
See application file for complete search history.

(56) References Cited

U.S. PATENT DOCUMENTS

2005/0073438 A1* 4/2005 Rodgers ................. G08G 1/161
340/944
2005/0154505 A1 7/2005 Nakamura et al.
(Continued)

FOREIGN PATENT DOCUMENTS

DE 102008036009 A1 10/2009
DE 102010049721 A1 4/2012
(Continued)

OTHER PUBLICATIONS

German Office Action, dated Jun. 9, 2020, for German Application No. 112017007631.5, with an English translation.

*Primary Examiner* — Thomas S McCormack
(74) *Attorney, Agent, or Firm* — Birch, Stewart, Kolasch & Birch, LLP.

(57) ABSTRACT

A vehicle situation that can occur at a later time than the current time is displayed on a first display device, a second display device, and a third display device, and display content is controlled so that a display content of the second display device includes a vehicle situation that can occur at a later time than the vehicle situation displayed on the first display device, and a display content of the third display device includes a vehicle situation that can occur at a later time than the vehicle situation displayed on the second display device.

16 Claims, 9 Drawing Sheets

(52) U.S. Cl.
CPC ...... *B60K 2370/736* (2019.05); *B60W 60/005* (2020.02); *B60W 2050/146* (2013.01); *G05D 1/0061* (2013.01)

(56) References Cited

U.S. PATENT DOCUMENTS

| | | | |
|---|---|---|---|
| 2012/0306663 A1* | 12/2012 | Mudalige | G08G 1/163 340/903 |
| 2013/0044218 A1 | 2/2013 | Matsuda et al. | |
| 2015/0073664 A1* | 3/2015 | Petridis | B60W 30/095 701/41 |
| 2016/0332569 A1* | 11/2016 | Ishida | B60W 30/08 |

FOREIGN PATENT DOCUMENTS

| | | |
|---|---|---|
| DE | 102014221132 A1 | 4/2016 |
| DE | 102013224917 A1 | 6/2016 |
| JP | 2005-199992 A | 7/2005 |
| JP | 2010-64691 A | 3/2010 |
| WO | WO 2011/132388 A1 | 10/2011 |

* cited by examiner

DISPLAY SYSTEM AND DISPLAY METHOD

TECHNICAL FIELD

The present invention relates to a display system provided with a plurality of display devices mounted on a vehicle, and a display method.

BACKGROUND ART

Conventionally, a technique has been proposed in which a display area of a display device mounted on a vehicle is divided depending on information content.

For example, Patent Literature 1 discloses an information display system for a vehicle that groups content of information to be recognized by a driver and divides a display area of a head-up display depending on the grouped content. In a windshield on which information displayed in the head-up display is displayed, information having a high degree of importance is displayed in a display area closer to the gaze of a driver gazing a travel path in front of the vehicle, and information having a low degree of importance is displayed in a display area farther from the gaze.

CITATION LIST

Patent Literatures

Patent Literature 1: JP 2005-199992 A

SUMMARY OF INVENTION

Technical Problem

In an automatic driving vehicle, it is necessary to convey the behavior of the vehicle or the sensing results of vehicles around the vehicle to occupants in an easily understandable manner. For example, in manual driving, a driver of the vehicle determines in time series a future situation such as a situation in which, if a pedestrian walks from the current position, he/she appears in front of the vehicle, and the driver can stop the vehicle as necessary.

However, the system disclosed in Patent Literature 1 groups information by determining only real-time situations, and therefore, it is not until the pedestrian runs in front of the vehicle and the vehicle automatically stops that the system reports to the occupant that the pedestrian runs out.

As described above, in the conventional technology, a situation which can be recognized by a driver in time series in manual driving cannot accurately be conveyed to the occupant in automatic driving. For this reason, the occupant in the vehicle feels uneasy about whether the automatic driving is functioning normally.

The present invention is accomplished to solve the foregoing problem, and an object of the present invention is to provide a display system and a display method with which it is possible to allow the occupant to accurately recognize a vehicle situation in a visual manner.

Solution to Problem

The display system according to the present invention includes a plurality of display devices provided in a vehicle interior; and a processor; and a memory storing instructions which, when executed by the processor, causes the processor to perform processes of: acquiring information inside and outside a vehicle; estimating a vehicle situation that is likely to occur at a later time from a current time on a basis of the acquired information; and displaying the estimated vehicle situation on a first display device and a second display device included in the plurality of display devices, and controlling display content in such a manner that display content of the second display device includes a vehicle situation that is likely to occur at a later time with respect to the vehicle situation displayed on the first display device.

Advantageous Effects of Invention

According to the present invention, the display content of the second display device is controlled so as to include a vehicle situation that can occur at a later time than the vehicle situation displayed on the first display device, whereby a vehicle situation that can occur at a later time can be displayed on the second display device. Thus, the occupant can accurately recognize the vehicle situation in a visual manner.

DESCRIPTION OF EMBODIMENTS

In order to describe the present invention in more detail, mode for carrying out the present invention will now be described with reference to accompanying drawings.

First Embodiment

Figure 1:
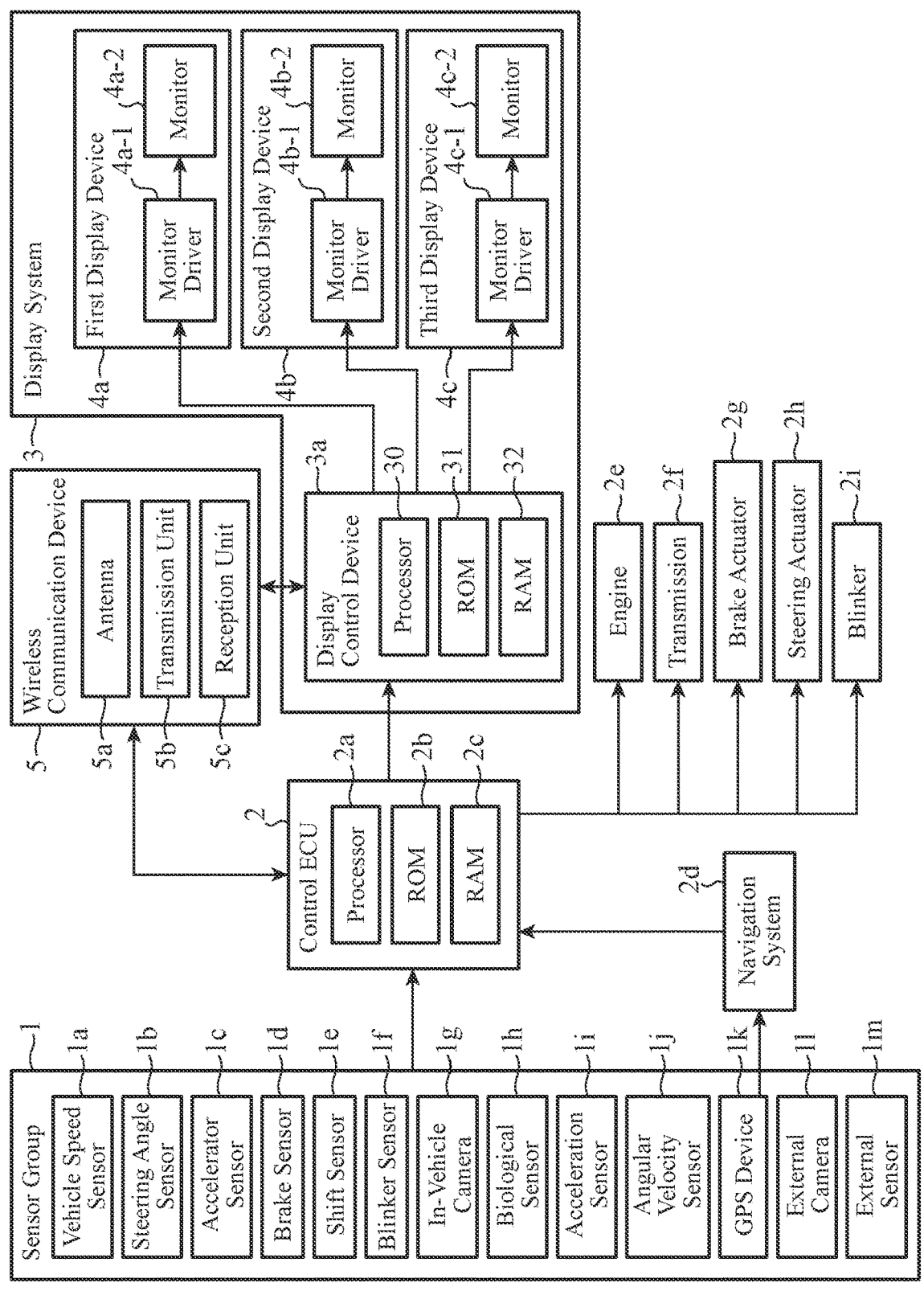
FIG. 1 is a block diagram showing a hardware configuration according to a first embodiment of the present invention.

FIG. 1 is a block diagram showing a hardware configuration according to the first embodiment of the present invention. A vehicle in the first embodiment includes a sensor group 1 and a navigation system 2d. A control ECU (electronic control unit) 2 can control hardware to be controlled on the basis of information obtained from the sensor group 1 and the navigation system 2d.

The sensor group 1 includes a vehicle speed sensor 1a, a steering angle sensor 1b, an accelerator sensor 1c, a brake sensor 1d, a shift sensor 1e, a blinker sensor 1f, an in-vehicle camera 1g, a biological sensor 1h, an acceleration sensor 1i, an angular velocity sensor 1j, a GPS device 1k, an external camera 1l, and an external sensor 1m.

The control ECU 2 outputs information received via a controller area network (CAN) to a display control device 3a of a display system 3.

The display control device 3a controls a first display device 4a, a second display device 4b, and a third display device 4c on the basis of the information input from the control ECU 2. The control ECU 2 receives information detected by each of a plurality of sensors included in the sensor group 1 or an image captured by a camera included in the sensor group 1.

The vehicle speed sensor 1a detects the speed of the vehicle, and outputs an electric signal (vehicle speed pulse) corresponding to the wheel speed to the control ECU 2. The steering angle sensor 1b detects the steering angle of the vehicle, and outputs an electric signal corresponding to the steering angle to the control ECU 2. The accelerator sensor 1c detects an opening degree of the accelerator of the vehicle, that is, an operation amount of an accelerator pedal, and outputs information indicating the operation amount of the accelerator pedal to the control ECU 2. The brake sensor 1d detects an amount of operation of the brake pedal, and outputs information indicating the amount of operation of the brake pedal to the control ECU 2.

The shift sensor 1e detects the current state (or change) of a shift lever, and outputs information indicating an operation of the shift lever such as a shift change performed by an occupant in the vehicle to the control ECU 2. The blinker sensor 1f detects an operation of a blinker (direction indicator), and outputs information indicating an operation instruction of the blinker to the control ECU 2 when the blinker is operated.

The in-vehicle camera 1g is provided to face a driver's seat in the vehicle, and captures an image of an occupant seated in the driver's seat (hereinafter referred to as a driver). Image information captured by the in-vehicle camera 1g is output to the control ECU 2.

The biological sensor 1h detects biological information of the driver. For example, the biological sensor 1h is an electroencephalogram sensor for detecting the brain wave of the driver and a pulse sensor for detecting the pulse of the driver. Biological information detected by the biological sensor 1h is output to the control ECU 2.

The acceleration sensor 1i detects the acceleration of the vehicle and is configured by, for example, a three-axis acceleration sensor. Vehicle acceleration information detected by the acceleration sensor 1i is output to the control ECU 2. The angular velocity sensor 1j detects the angular velocity (gyro) of the vehicle, and angular velocity information detected by the angular velocity sensor 1j is output to the control ECU 2. The control ECU 2 can detect the turning speed of the vehicle on the basis of the angular velocity information.

The global positioning system (GPS) device 1k detects the position of the vehicle using radio waves transmitted from a GPS satellite. The position coordinates of the vehicle detected by the GPS device 1k are output to the control ECU 2 and the navigation system 2d.

The external camera 1l captures an image of the outside of the vehicle. For example, the external camera 1l is provided on each of the front, rear, left, and right of the vehicle, and captured images captured in the respective directions by the external cameras 1l are output to the control ECU 2. The control ECU 2 detects and recognizes a target object such as a pedestrian, a vehicle, and an obstacle outside the vehicle on the basis of the captured image input from the external cameras 1l.

The external sensor 1m detects an object existing outside the vehicle, and can be implemented by, for example, an ultrasonic sensor, a radar sensor, a millimeter wave radar sensor, or an infrared laser sensor. The external sensor 1m outputs detection information to the control ECU 2.

The control ECU 2 detects the distance between the vehicle and the object and the position of the object on the basis of the detection information of the object input from the external sensor 1m. The control ECU 2 may detect the distance between the vehicle and the object and the position of the object, or the external sensor 1m itself may detect the distance and the position and output the detection result to the control ECU 2.

The control ECU 2 has a function of entirely controlling the vehicle. As shown in FIG. 1, the control ECU 2 includes a processor 2a, a read only memory (ROM) 2b, and a random access memory (RAM) 2c. The processor 2a is a calculation processing circuit that performs various types of calculation processing in the control ECU 2, and is hardware called a processor, a calculation processing circuit, an electric circuit, a controller, or the like. The processor 2a is configured by a set of one or more calculation processing circuits. The processor 2a can read out programs from the ROM 2b, expand them into the RAM 2c, and execute calculation processing.

The ROM 2b is a non-volatile storage device that stores one or more programs.

The RAM 2c is a volatile storage device used by the processor 2a as an expansion area for programs and various types of information.

The ROM 2b and the RAM 2c are constituted by, for example, a semiconductor storage device, and can also be called memories.

The ROM 2b has been described as an example of the storage device storing the programs executed by the processor 2a. However, the storage device is not limited thereto. For example, the storage device may be a non-volatile mass storage device called a storage such as a hard disk drive (HDD) or a solid state drive (SSD). A storage device including a storage may be collectively referred to as a memory. The same applies to the display control device 3a described later.

The navigation system 2d has a function of calculating a recommended route to the destination of the vehicle on the basis of the vehicle position and map information.

The navigation system 2d may calculate a recommended route of the vehicle on the basis of information such as traffic congestion information around the vehicle and road closed information obtained by communicating with an external device.

The navigation system 2d may be a device that receives a recommended route calculated by a server on the basis of vehicle position information and destination information. The navigation system outputs vehicle route information to the control ECU 2.

An engine 2e is a power source for driving the vehicle, and generates power for rotating the wheels by burning fuel. The engine 2e can also operate in response to instructions from the control ECU 2. A transmission 2f transmits the power generated by the engine 2e to the wheels. The transmission 2f can change the torque transmitted to the wheels by changing gears on the basis of an instruction from the control ECU 2.

A brake actuator 2g is a mechanism for operating the brake (reduction gear) of the vehicle, and can operate the brake on the basis of an instruction from the control ECU 2 to decelerate the vehicle. A steering actuator 2h is a mechanism for operating the steering (steering device) of the vehicle, and can control the steering on the basis of an instruction from the control ECU 2 to control the traveling direction of the vehicle. The blinker 2i is a direction indicator that indicates the traveling direction of the vehicle, and blinks on the basis of an instruction from the control ECU 2 to notify the outside of the vehicle of the traveling direction of the vehicle.

The display system 3 according to the first embodiment includes the display control device 3a, the first display device 4a, the second display device 4b, and the third display device 4c.

The vehicle in the first embodiment has a function of displaying the operating state of the vehicle or the situation around the vehicle on each of the first display device 4a, the second display device 4b, and the third display device 4c.

The display control device 3a is a control device that controls display processes by the first display device 4a, the second display device 4b, and the third display device 4c.

Similar to the control ECU 2, the display control device 3a includes a processor 30, a ROM 31, and a RAM 32.

The processor 30 is a calculation processing circuit that performs various types of calculation processing in the display control device 3a, and is hardware called a processor, a calculation processing circuit, an electric circuit, or a controller. The processor 30 is configured by a set of one or more calculation processing circuits. The processor 30 can read out programs from the ROM 31, expand them into the RAM 32, and execute calculation processing.

The first display device 4a is provided in the vehicle interior and has the smallest movement amount of gaze of the driver gazing an area in front of the vehicle. The first display device 4a includes a monitor driver 4a-1 and a monitor 4a-2. The monitor driver 4a-1 is a drive device that causes the monitor 4a-2 to display. The monitor 4a-2 displays display information input from the monitor driver 4a-1. The monitor driver 4a-1 controls the display on the monitor 4a-2 on the basis of an instruction from the display control device 3a.

The second display device 4b is provided in the vehicle interior, and has the second smallest movement amount of gaze of the driver gazing an area in front of the vehicle after the first display device 4a. The second display device 4b has a monitor driver 4b-1 and a monitor 4b-2. The monitor driver 4b-1 is a drive device that causes the monitor 4b-2 to display. The monitor 4b-2 displays display information input from the monitor driver 4b-1. The monitor driver 4b-1 controls display on the monitor 4b-2 on the basis of an instruction from the display control device 3a.

The third display device 4c is provided in the vehicle interior and has the largest movement amount of gaze of the driver gazing an area in front of the vehicle. The third display device 4c has a monitor driver 4c-1 and a monitor 4c-2. The monitor driver 4c-1 is a drive device that causes the monitor 4c-2 to display. The monitor 4c-2 displays display information input from the monitor driver 4c-1. The monitor driver 4c-1 controls the display on the monitor 4c-2 on the basis of an instruction from the display control device 3a.

A wireless communication device 5 wirelessly communicates with an external communication device. For example, the wireless communication device 5 functions as an intelligent transport system (ITS) device. In the wireless communication device 5, a transmission unit 5b transmits an information request signal to the external device via an antenna 5a via the antenna 5a, and a reception unit 5c receives road traffic information from the external device via the antenna 5a. The road traffic information is output from the wireless communication device 5 to the control ECU 2.

Figure 2:
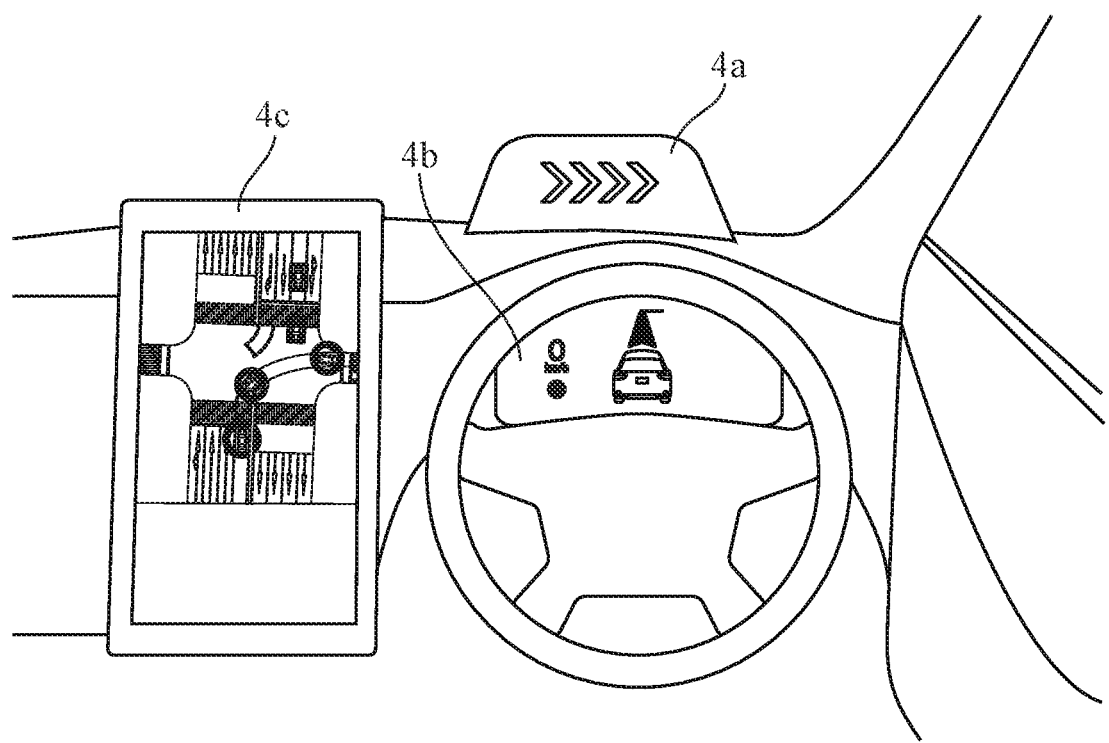
FIG. 2 is a view showing the appearance of a first display device, a second display device, and a third display device according to the first embodiment.

FIG. 2 is a view showing the appearance of the first display device 4a, the second display device 4b, and the third display device 4c. In FIG. 2, the first display device 4a is a head-up display that uses a combiner disposed between the driver and a windshield as a projection target of display information. The combiner described above corresponds to the monitor 4a-2. The second display device 4b is a meter panel disposed in front of the steering wheel. The third display device 4c is a monitor disposed on a center console.

While driving the vehicle, the driver is gazing an area in front of the vehicle. Therefore, the movement amount of the driver's gaze to see the content displayed on the combiner is the smallest, and the movement amount of the driver's gaze to see the content displayed on the meter panel is the second smallest. When seeing the content displayed on the monitor disposed on the center console, the driver needs to greatly move his/her gaze from the area in front of the vehicle to the center console.

An example will be given of a case where the vehicle is automatically driven at an automatic driving level 3 (a level at which the vehicle automatically performs acceleration, steering, and braking, and the driver can switch to manual driving at the request of the vehicle). In this case, when the vehicle suddenly accelerates or decelerates or change lanes, an occupant in the vehicle feels uneasy about whether the automatic driving is functioning normally.

To address this problem, a vehicle situation that can occur in a time range closest to the current time is displayed on the first display device 4a having the smallest movement amount of the driver's gaze.

The second display device 4b having the second smallest movement amount of the driver's gaze after the first display device 4a displays a vehicle situation that can occur in a time range closer to the current time.

The third display device 4c having the largest movement amount of the driver's gaze displays a vehicle situation that can occur in a time range later than the situation displayed on the second display device 4b.

As described above, in the first embodiment, a vehicle situation that can occur in a time range closer to the current time is displayed on the display devices in order from the display device that is easiest for the driver to see, and this makes it possible to allow the driver to visually recognize, in an appropriate manner, information that requires a quick response or should be transmitted in real time.

Figure 3:
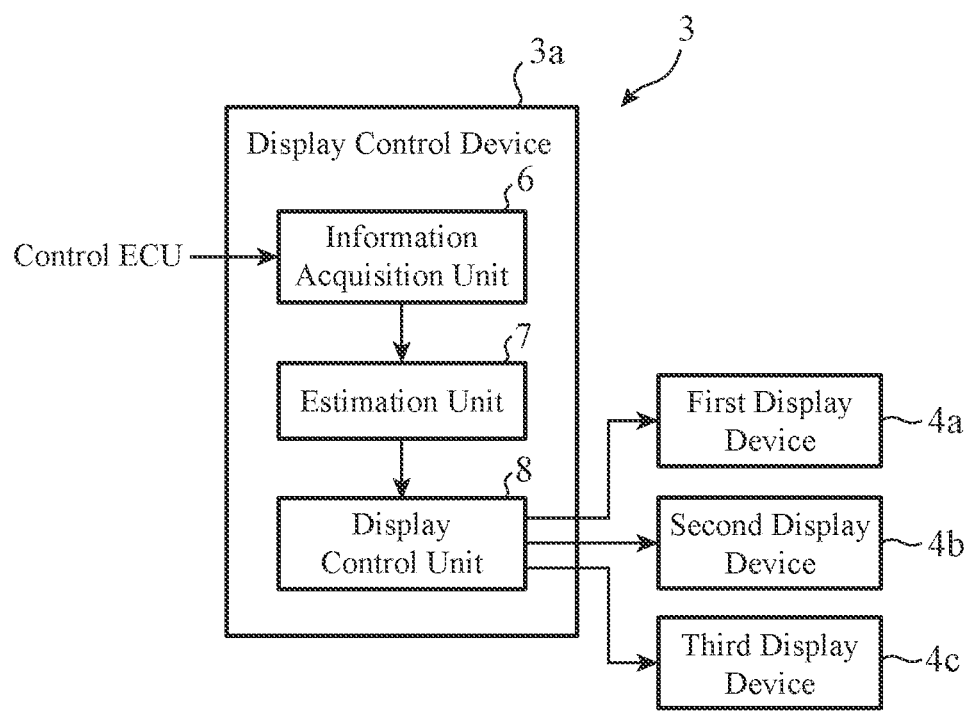
FIG. 3 is a block diagram showing a functional configuration of a display system according to the first embodiment.

FIG. 3 is a block diagram showing a functional configuration of the display system 3 according to the first embodiment.

The display control device 3a includes an information acquisition unit 6, an estimation unit 7, and a display control unit 8.

The information acquisition unit 6 acquires information inside and outside the vehicle. Information acquired by the information acquisition unit 6 includes, for example, vehicle speed information, steering angle information, accelerator operation information, brake operation information, shift lever operation information, blinker operation information, driver's gaze information, driver's biological information, vehicle acceleration information, vehicle turning speed information, vehicle position information, detection information of an object existing around the vehicle, road traffic information, vehicle route information, and driver's personal information.

The estimation unit 7 estimates a vehicle situation that can occur at a later time than the current time on the basis of the information acquired by the information acquisition unit 6.

For example, the estimation unit 7 calculates a time until the movement path of the vehicle and the movement path of an object interfere with each other in the future on the basis of the information (position, speed, acceleration, and traveling direction) about the vehicle state and the detection information of the object existing around the vehicle which have been acquired by the information acquisition unit 6. The vehicle situation in which the movement path of the vehicle and the movement path of the object interfere with each other and the time at which this situation can occur are output from the estimation unit 7 to the display control unit 8.

The display control unit 8 controls the display content of the first display device 4a, the second display device 4b, and the third display device 4c in such a manner that the display content of the vehicle situation estimated by the estimation unit 7 includes the vehicle situation that can occur at a later time in the order of the first display device 4a, the second display device 4b, and the third display device 4c.

Figure 4:
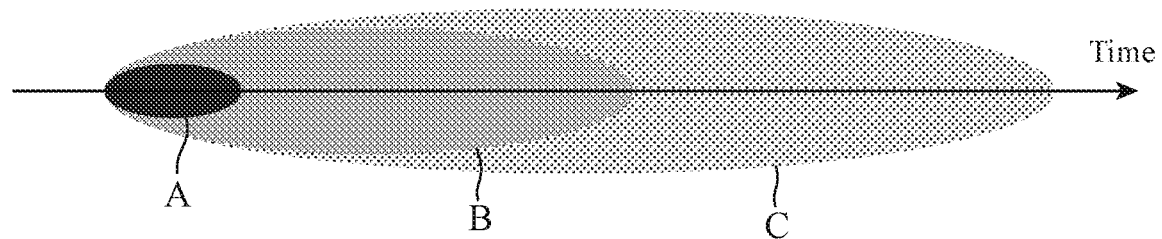
FIG. 4 is a diagram schematically showing a time range in the first embodiment.

FIG. 4 is a diagram schematically showing the time range in the first embodiment. In FIG. 4, the time range later than the current time is divided into three: a time range A, a time range B, and a time range C.

In FIG. 4, the time range A is the closest to the current time. The time range B includes a time later than the time range A, and the time range C includes a time later than the time range B. The time range A is assigned to the first display device 4a, the time range B is assigned to the second display device 4b, and the time range C is assigned to the third display device 4c.

The display control unit 8 displays, on the basis of the vehicle situation estimated by the estimation unit 7 and the time at which this situation can occur, this vehicle situation on the first display device 4a to which the time range A is assigned, the second display device 4b to which the time range B is assigned, and the third display device 4c to which the time range C is assigned.

For example, the vehicle situation intended to be conveyed to the driver in real time or the vehicle situation intended to be quickly responded by the driver when a driving mode is switched to manual driving is displayed on the first display device 4a to which the time range A is assigned. The vehicle situation having more time to be responded than the time range A is displayed on the second display device 4b to which the time range B is assigned. The vehicle situation having more time to be responded than the time range B is displayed on the third display device 4c to which the time range C is assigned.

The display control unit 8 causes the first display device 4a, the second display device 4b, and the third display device 4c to respectively display information included in the time range A, the time range B, and the time range C. When doing so, the display control unit 8 may change the scale or angle of view of the display content of each of the display devices.

Next, the operation will be described.

Figure 5:
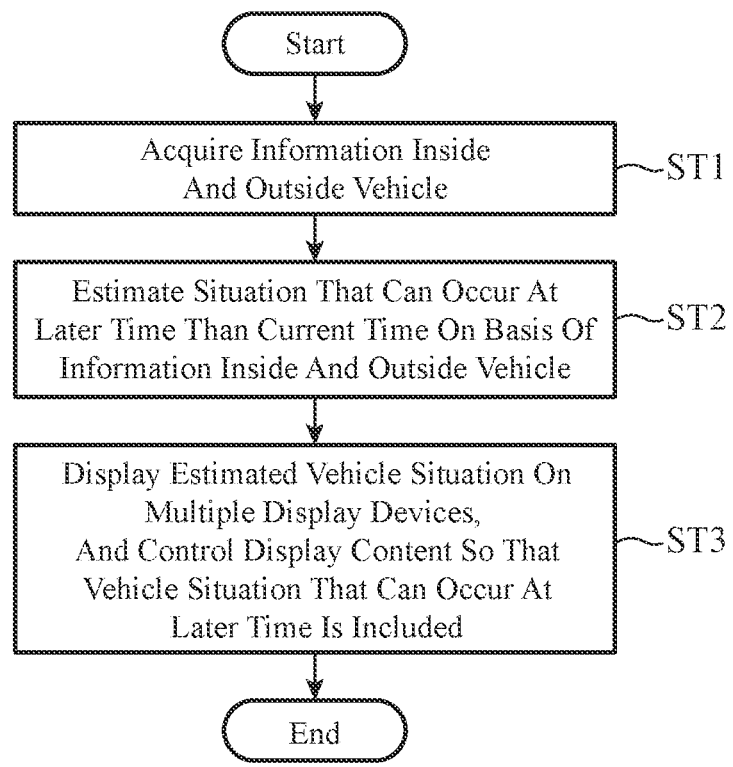
FIG. 5 is a flowchart showing a display method according to the first embodiment.

FIG. 5 is a flowchart showing the display method according to the first embodiment. FIG. 5 is a series of processes after information inside and outside the vehicle is acquired until the information is displayed in the first display device 4a, the second display device 4b, and the third display device 4c.

First, the information acquisition unit 6 acquires information inside and outside the vehicle from the control ECU 2 and the wireless communication device 5 (step ST1). The information inside and outside the vehicle is, for example, information obtained by the sensor group 1, the navigation system 2d, and the wireless communication device 5 shown in FIG. 1.

Next, the estimation unit 7 estimates a vehicle situation that can occur at a later time than the current time on the basis of the information acquired by the information acquisition unit 6 (step ST2).

For example, the estimation unit 7 calculates a time at which an area around the route of the vehicle which is automatically driven (hereinafter referred to as an area around the route) and the movement path of the object may interfere with each other on the basis of the vehicle route information and the detection information of the object existing around the vehicle which have been acquired by the information acquisition unit 6.

The interference between the area around the route and the object can occur and the time at which this situation can occur are output from the estimation unit 7 to the display control unit 8.

The display control unit 8 displays the vehicle situation estimated by the estimation unit 7 on the first display device 4a, the second display device 4b, and the third display device 4c, and controls display content so that a vehicle situation that can occur at a later time is included (step ST3).

Specifically, the display control unit 8 controls the display content in such a manner that the display content of the second display device 4b includes a vehicle situation that can occur at a later time than the vehicle situation displayed on the first display device 4a, and the display content of the third display device 4c includes a vehicle situation that can occur at a later time than the vehicle situation displayed on the second display device 4b.

For example, the display control unit 8 displays the estimated vehicle situation on the first display device 4a to which the time range A is assigned, the second display device 4b to which the time range B is assigned, and the third display device 4c to which the time range C is assigned.

The time range A is, for example, 3 seconds later than the current time. The time range B is, for example, 10 seconds later than the current time. The time range C is, for example, 60 seconds later than the current time. In these time ranges, the number of seconds can be changed depending on the type of vehicle or vehicle situation.

When the estimation unit 7 estimates that an oncoming vehicle will interfere with the right turn route of the vehicle within 3 seconds, the display control unit 8 displays information about this situation on the first display device 4a to which the time range A is assigned.

When the estimation unit 7 estimates that the oncoming vehicle will interfere with the right turn route of the vehicle within 10 seconds, the display control unit 8 displays information about this situation on the second display device 4b to which the time range B is assigned.

When the estimation unit 7 estimates that the oncoming vehicle will interfere with the right turn route of the vehicle within 60 seconds, the display control unit 8 displays information about this situation on the third display device 4c to which the time range C is assigned.

Information about vehicle situation indicates information necessary to display this situation, and includes, for example, position information of the intersection in the area around the route, the positional relationship between the vehicle and the oncoming vehicle, and information indicating the movement of the vehicle and the oncoming vehicle.

Figure 6:
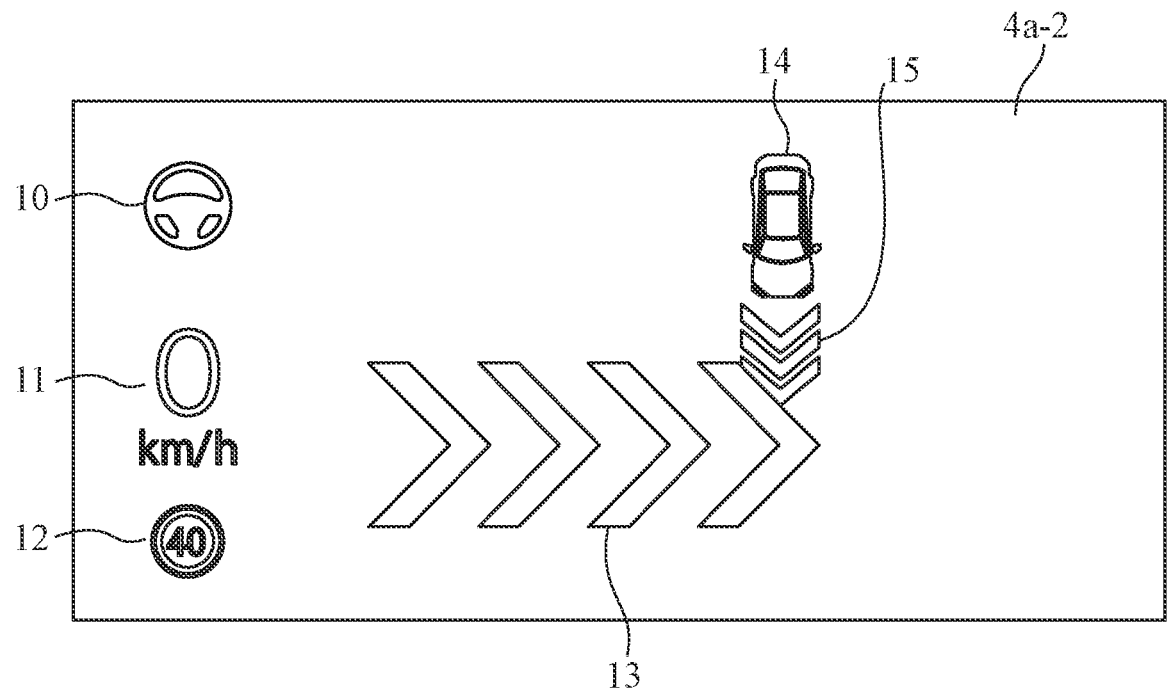
FIG. 6 is a view showing a display example of the first display device in the first embodiment.

FIG. 6 is a view showing a display example of the first display device 4a, and is a display screen of the monitor 4a-2. The first display device 4a has the smallest movement amount of the driver's gaze while the vehicle is traveling, and the time range A is assigned thereto.

In FIG. 6, a mark 10 indicates that the vehicle is in an automatic driving mode.

Numerical information 11 indicates the current vehicle speed. A mark 12 indicates the speed limit of the road on which the vehicle is traveling.

For example, the situation in which the oncoming vehicle will interfere with the right turn route of the vehicle within 3 seconds in the area around the route is displayed by the display control unit 8 on the first display device 4a to which the time range A is assigned. A mark 13 indicates the current driving behavior of the vehicle, and indicates a right turn of the vehicle. An icon 14 indicates the oncoming vehicle. A mark 15 indicates the movement path of the oncoming vehicle.

The occupant of the vehicle visually recognizes the contact between the mark 13 and the mark 15, and thus can see that the movement path of the vehicle and the movement path of the oncoming vehicle will interfere with each other if the vehicle and the oncoming vehicle keep traveling. Therefore, the occupant can expect that the vehicle will automatically stop to allow the oncoming vehicle to pass.

The situation in which the oncoming vehicle will interfere with the right turn route of the vehicle within 3 seconds is displayed on the first display device 4a that is easy for the driver to see, and can be easily, visually recognized by the driver. For this reason, even if the automatic driving mode is switched to the manual driving mode, the driver can temporarily stop to allow the oncoming vehicle to pass without confusion.

Figure 7:
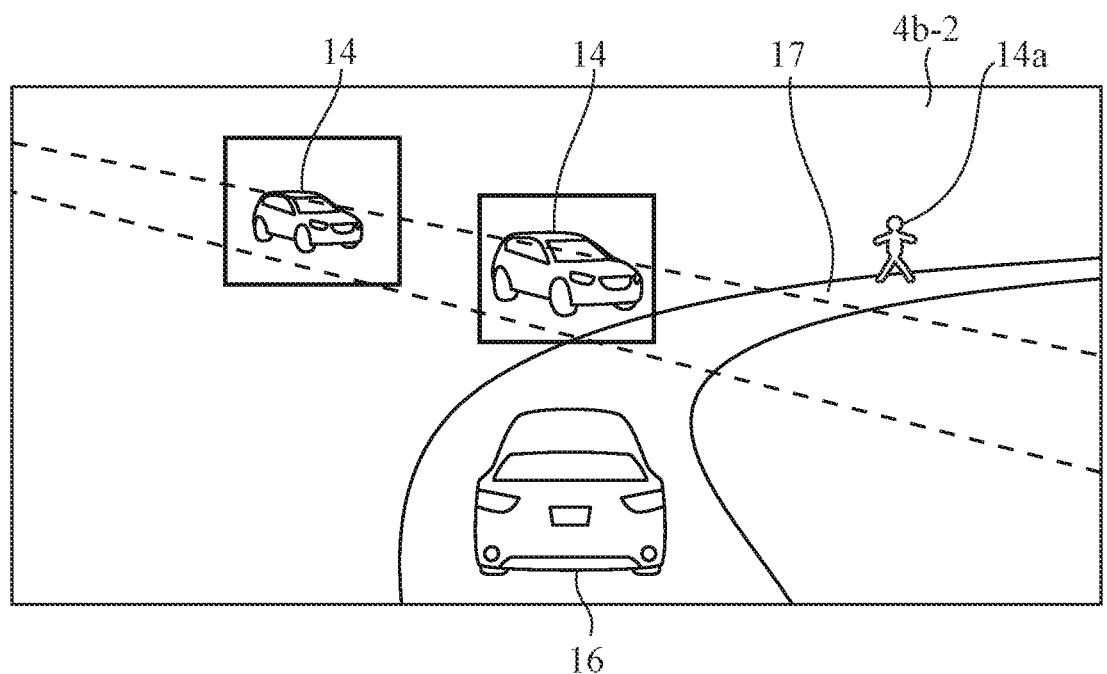
FIG. 7 is a view showing a display example of the second display device in the first embodiment.

FIG. 7 is a view showing a display example of the second display device 4b, and is a display screen of the monitor 4b-2. The second display device 4b has the second smallest movement amount of the driver's gaze while the driver sees the display content after the first display device 4a, and the time range B is assigned to the second display device 4b.

In FIG. 7, an icon 14 indicates an oncoming vehicle as in FIG. 6. An icon 14a indicates a pedestrian. An icon 16 indicates the vehicle equipped with the display system 3. A route display 17 indicates the travel route of the vehicle indicated by the icon 16.

For example, the situation in which the oncoming vehicle and the pedestrian will interfere with the right turn route of the vehicle within 10 seconds in the area around the route is displayed by the display control unit 8 on the second display device 4b to which the time range B is assigned.

The occupant of the vehicle can see that, if the vehicle and the oncoming vehicle keep traveling, the movement paths of them will interfere with each other by visually recognizing the movement of the icon 14 with respect to the route display 17.

Furthermore, the occupant of the vehicle can see, by visually recognizing the icon 14a on the route display 17, that, even if the vehicle allows the oncoming vehicle to pass, the pedestrian is on a pedestrian crossing in the traveling direction of the vehicle.

Thus, the occupant of the vehicle can expect that the vehicle will automatically stop to allow the oncoming vehicle to pass, and that the vehicle will automatically stop again until the pedestrian crosses.

Since the time range B includes a time later than the time range A, the second display device 4b can display the change over time of the vehicle situation in more detail. For this reason, even if the automatic driving mode is switched to the manual driving mode, the driver can perform a driving operation depending on the vehicle situation without confusion.

Figure 8:
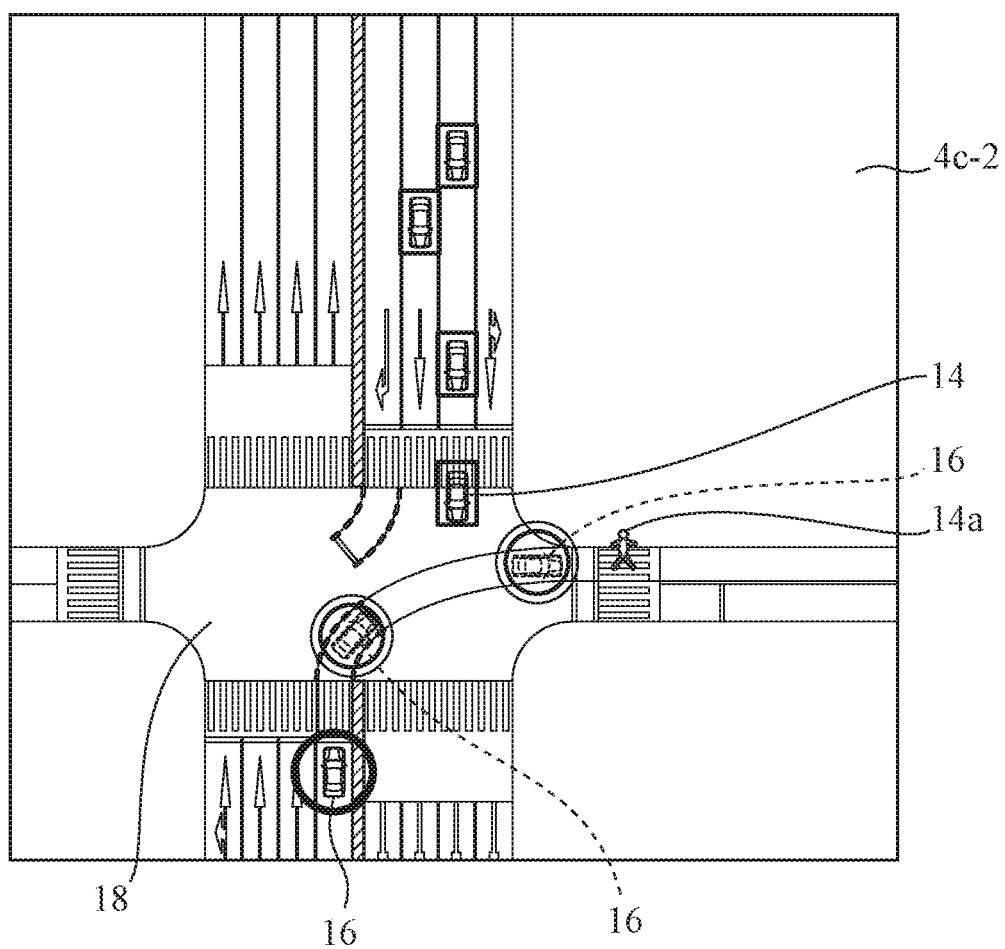
FIG. 8 is a view showing a display example of the third display device in the first embodiment.

FIG. 8 is a view showing a display example of the third display device 4c, and is a display screen of the monitor 4c-2. The third display device 4c has the largest movement amount of the driver's gaze while the driver sees the display content, and the time range C is assigned to the third display device 4c.

In FIG. 8, an icon 14 indicates an oncoming vehicle as in FIG. 6, and an icon 14a indicates a pedestrian as in FIG. 7. An icon 16 indicates the vehicle equipped with the display system 3, as in FIG. 7. These icons are arranged on an intersection image 18.

For example, the situation in which the oncoming vehicle will interfere with the right turn route of the vehicle within 60 seconds in the area around the route is displayed by the display control unit 8 on the third display device 4c to which the time range C is assigned. The occupant of the vehicle can see from the movement of the icon 14 and the movement of the icon 16 on the intersection that, if the vehicle and the oncoming vehicle keep traveling, the movement paths of them will interfere with each other.

Furthermore, the occupant of the vehicle can see, by visually recognizing the icon 14a on the pedestrian crossing ahead of the right turn route of the vehicle, that, even if the vehicle allows the oncoming vehicle to pass, the pedestrian is on the pedestrian crossing ahead. Thus, the occupant of the vehicle can expect that the vehicle will automatically stop to allow the oncoming vehicle to pass, and that the vehicle will automatically stop again until the pedestrian crosses.

Since the time range C includes a time later than the time range B, the third display device 4c can display the change over time of the vehicle situation in more detail than in the time range B.

For example, it is possible to indicate the vehicle situation in a wide region including the area around the route. In FIG. 8, the icon 16 enclosed by a circle is displayed in both a position where the vehicle stops to allow the oncoming vehicle to pass and a position where the vehicle stops to allow the pedestrian to cross the pedestrian crossing. Accordingly, by visually recognizing the display of FIG. 8, the occupant of the vehicle can grasp the overview of the vehicle behavior that cannot be displayed on the first display device 4a and the second display device 4b.

Figure 9A:
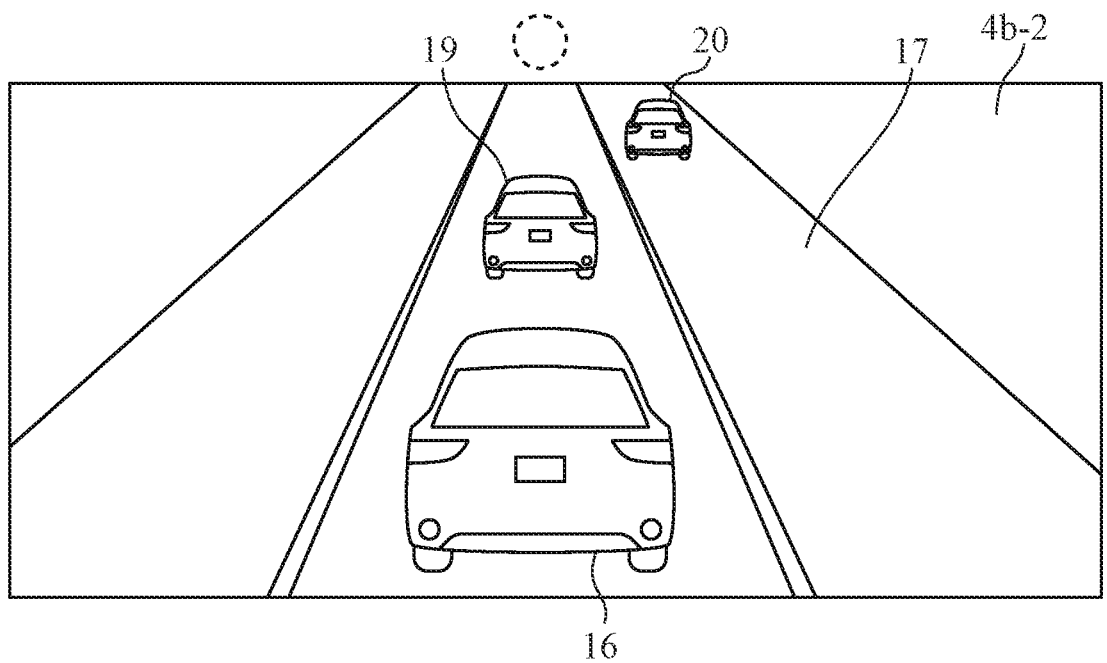
FIG. 9A is a view showing a situation in front of the vehicle displayed on the second display device.

FIG. 9A is a view showing a situation in front of the vehicle displayed on the second display device 4b. In FIG. 9A, an icon 16 indicates the vehicle equipped with the display system 3 as in FIG. 7. An icon 19 indicates a preceding vehicle that will interfere with the area around the route of the vehicle after 7 seconds, and an icon 20 indicates a preceding vehicle that will interfere with the area around the route of the vehicle after 9 seconds. A broken circle indicates a preceding vehicle that will interfere with the area around the route of the vehicle after 11 seconds.

The monitor 4b-2 of the second display device 4b displays the vehicle situation that can occur in the time range B which is at most 10 seconds later than the current time. Therefore, the preceding vehicle that will interfere with the area around the route after 11 seconds is not displayed in the monitor 4b-2.

Figure 9B:
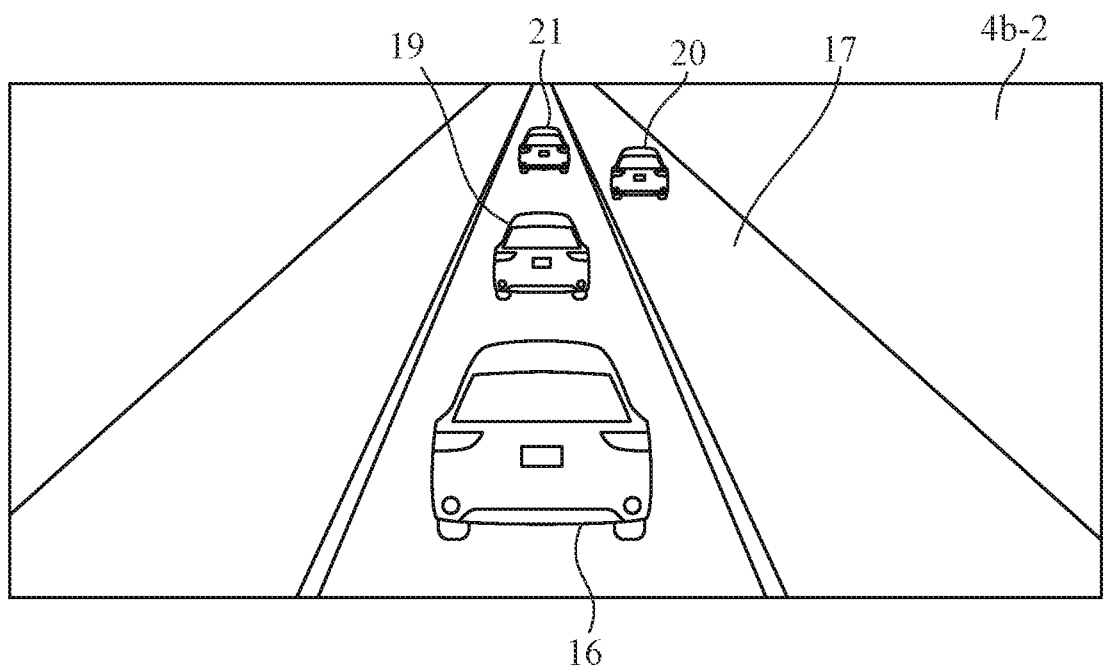
FIG. 9B is a view showing a situation in front of the vehicle displayed on the second display device when the preceding vehicle in the situation shown in FIG. 9A decelerates.

FIG. 9B is a view showing a situation in front of the vehicle displayed on the second display device 4b when the preceding vehicle in the situation displayed in FIG. 9A decelerates. In FIG. 9B, the preceding vehicle that will interfere with the area around the route after 11 seconds decelerates, and the estimation unit 7 estimates that the preceding vehicle will interfere with the area around the route within 10 seconds. This situation is displayed by the display control unit 8 on the second display device 4b to which the time range B is assigned. An icon 21 indicates the preceding vehicle that is estimated to interfere with the area around the route within 10 seconds due to deceleration. In this case, the display control unit 8 may reduce the display area shown in FIG. 9A so as to additionally display the preceding vehicle indicated by the icon 21.

When the preceding vehicle indicated by the icon 21 in the situation in FIG. 9B accelerates, and the estimation unit 7 estimates that the preceding vehicle will interfere with the area around the route after 11 seconds, this situation is displayed by the display control unit 8 on the third display device 4c to which the time range C is assigned. In this case, the display control unit 8 may enlarge the display area shown in FIG. 9B so as to exclude the preceding vehicle indicated by the icon 21 as shown in FIG. 9A.

In FIGS. 9A and 9B, the case where the display control unit 8 adjusts the scale of the display area depending on the time range is shown, but the angle of view may be adjusted.

As described above, in the display system 3 according to the first embodiment, the information acquisition unit 6 acquires information inside and outside the vehicle. The estimation unit 7 estimates a vehicle situation that can occur at a later time than the current time on the basis of the information acquired by the information acquisition unit 6. The display control unit 8 displays the vehicle situation estimated by the estimation unit 7 on the first display device 4a, the second display device 4b, and the third display device 4c, and controls display content in such a manner that the display content of the second display device 4b includes a vehicle situation that can occur at a later time than the vehicle situation displayed on the first display device 4a, and the display content of the third display device 4c includes a vehicle situation that can occur at a later time than the vehicle situation displayed on the second display device 4b.

With this configuration, the vehicle situation that can occur at a later time (in the future) is displayed on the display device, whereby the vehicle situation can be accurately recognized by the occupant in a visual manner.

Further, in the display system 3 according to first embodiment, the first display device 4a is provided at a position closer to the gaze of the occupant in the driver's seat while the vehicle is traveling than the second display device 4b, and the second display device 4b is provided at a position closer to the gaze of the occupant in the driver's seat while the vehicle is traveling than the third display device 4c.

For example, the first display device 4a to which the time range A closest to the current time is assigned is provided at a position closest to the gaze of the driver, the second display device 4b to which the time range B including a time later than the time range A is assigned is provided at a position next closest to the gaze of the driver, and the third display device 4c to which the time range C including a time later than the time range B is assigned is provided at a position farthest from the gaze of the driver.

This configuration enables the occupant to accurately recognize a future situation that can occur on the vehicle in a visual manner.

Second Embodiment

Figure 10:
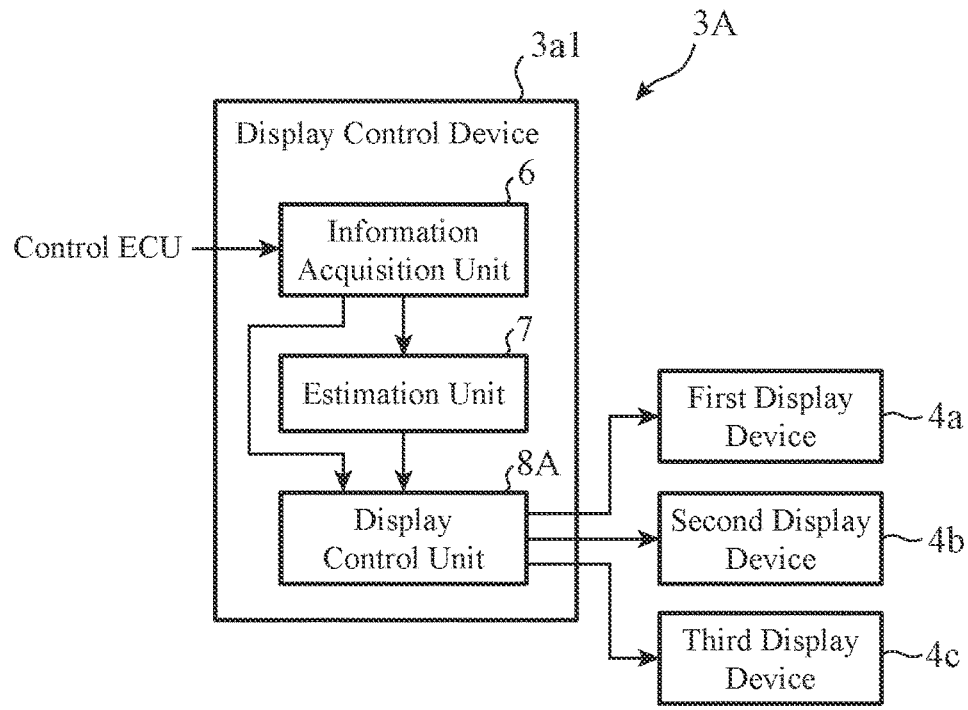
FIG. 10 is a block diagram showing a functional configuration of a display system according to a second embodiment of the present invention.

FIG. 10 is a block diagram showing a functional configuration of a display system 3A according to a second embodiment. In FIG. 10, the same components as those in FIG. 3 are identified by the same reference signs, and the description thereof will be omitted.

A display control device 3a1 includes an information acquisition unit 6, an estimation unit 7, and a display control unit 8A. The display control unit 8A controls display content of a first display device 4a, a second display device 4b, and a third display device 4c so that the display content includes a vehicle situation that can occur at a later time in the order of the first display device 4a, the second display device 4b, and the third display device 4c, on the basis of the information acquired by the information acquisition unit 6.

Next, the operation will be described.

Figure 11:
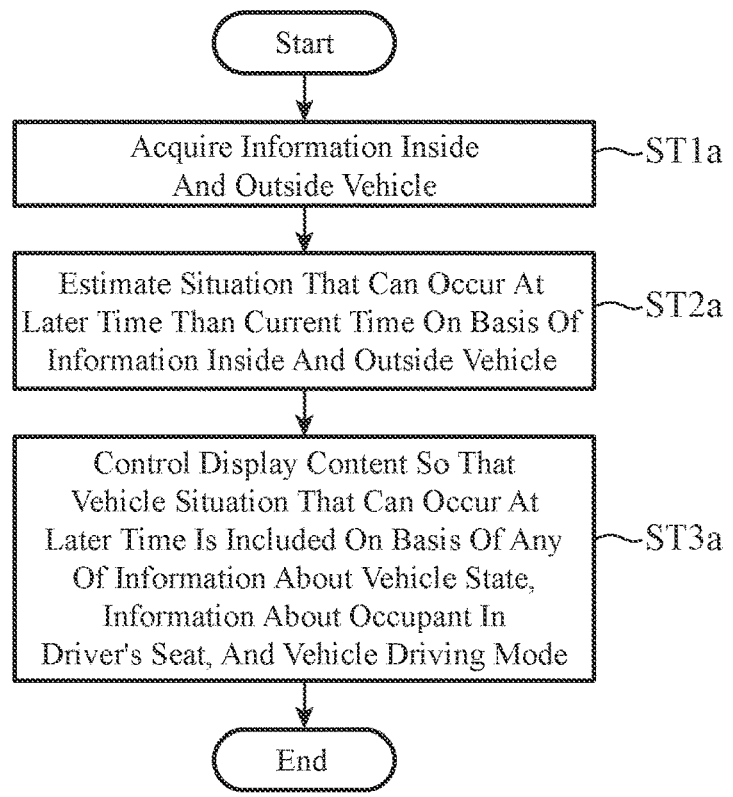
FIG. 11 is a flowchart showing a display method according to the second embodiment.

FIG. 11 is a flowchart showing a display method according to the second embodiment. FIG. 11 is a series of processes after information inside and outside the vehicle is acquired until the information is displayed on the first display device 4a, the second display device 4b, and the third display device 4c. Note that processes in step ST1a and step ST2a in FIG. 11 are the same as those in step ST1 and step ST2 in FIG. 5, so that the description thereof will be omitted.

In step ST3a, the display control unit 8A displays a vehicle situation in the first display device 4a, the second display device 4b, and the third display device 4c, and controls display content in such a manner that the display content includes a vehicle situation that can occur at a later time on the basis of any of information about a vehicle state, information about an occupant in the driver's seat, and a driving mode of the vehicle which have been acquired by the information acquisition unit 6.

Specifically, the display control unit 8A controls the display content in such a manner that the display content of the second display device 4b includes a vehicle situation that can occur at a later time than the vehicle situation displayed on the first display device 4a, and the display content of the third display device 4c includes a vehicle situation that can occur at a later time than the vehicle situation displayed on the second display device 4b.

In particular, the display control unit 8A controls the display content of the first display device 4a, the second display device 4b, and the third display device 4c by extending each of the time range A, the time range B, and the time range C on the basis of any of the information about the vehicle state, the information about the occupant in the driver's seat, and the driving mode of the vehicle.

The information about the vehicle state is, for example, at least one of a vehicle speed, an accelerator operation amount, a brake operation amount, and a set inter-vehicle distance.

The information about the occupant in the driver's seat is, for example, at least one of a degree of attention of the occupant in the driver's seat to the front, a degree of experience of the occupant in the driver's seat in automatic driving, a psychological state of the occupant in the driver's seat, a degree of uneasiness of the occupant in the driver's seat, the age of the occupant in the driver's seat, and the eyesight or hearing of the occupant in the driver's seat.

The driving mode of the vehicle is either an automatic driving mode or a manual driving mode.

For example, the display control unit 8A may extend each of the time range A, the time range B, and the time range C as the traveling speed of the vehicle increases.

When the traveling speed of the vehicle is within a low speed range (for example, 0 to 20 km/h) (case 1), the display control unit 8A keeps initial settings of the time range A, the time range B, and the time range C.

When the vehicle traveling speed is within a medium speed range (for example, 20 to 60 km/h) (case 2), the display control unit 8A extends each of the time range A, time range B, and the time range C from the initial settings.

When the traveling speed of the vehicle is within a high speed range (for example, equal to or more than 60 km/h) (case 3), the display control unit 8A extends each of the time range A, the time range B, and the time range C from the settings in the case 2.

As a result, a vehicle situation that can occur at a later time range can be displayed on the display device which is easier to see from the occupant in the driver's seat, as the traveling speed of the vehicle increases, and thus, display of information far in advance is enabled.

The occupant in the driver's seat in an automatic driving vehicle with an automatic driving level 3 needs to be prepared to perform manual driving in case of failure of the automatic driving system.

In view of this, the display control unit 8A may extend each of the time range A, the time range B, and the time range C as the degree of attention of the occupant in the driver's seat to the front decreases.

For example, the display control unit 8A analyzes an angle of gaze of the occupant in the driver's seat on the basis of gaze information of the occupant in the driver's seat acquired by the in-vehicle camera 1g, and calculates, as the degree of attention to the front, the degree in which the angle of gaze obtained as a result of the analysis matches the angle of gaze to the front.

When the degree of attention to the front is high (for example, the deviation from the angle of gaze to the front is 0 to 20 degrees on average) (case 1a), the display control unit 8A keeps the initial settings of the time range A, the time range B, and the time range C.

When the degree of attention to the front is medium (for example, the deviation from the angle of gaze to the front is 20 to 60 degrees on average) (case 2a), the display control unit 8A extends the time range A, the time range B, and the time range C from the initial settings.

When the degree of attention to the front is low (for example, the deviation from the angle of gaze to the front is equal to or more than 60 degrees on average) (case 3a), the display control unit 8A extends the time range A, the time range B, and the time range C from the settings in the case 2a.

As a result, a vehicle situation that can occur at a later time range can be displayed on the display device which is easier to see from the occupant in the driver's seat, as the degree of attention of the occupant in the driver's seat to the front decreases, and thus, display of information far in advance is enabled.

The display control unit 8A may extend each of the time range A, the time range B, and the time range C as the degree of experience of the occupant in the driver's seat in the automatic driving decreases.

For example, the display control unit 8A extracts a driving record from the information about the occupant in the driver's seat, and calculates, as the degree of experience in automatic driving, a value obtained by standardizing the number of times the occupant rides the vehicle by the reference number of riding times or a value obtained by standardizing an amount of time the occupant rides the vehicle with a reference amount of time.

When the degree of experience in automatic driving is high (for example, when the degree corresponds to the case where the number of times the occupant rides the vehicle is equal to or more than 20) (case 1b), the display control unit 8A keeps the initial settings of the time range A, the time range B, and the time range C.

When the degree of experience in automatic driving is medium (for example, when the degree corresponds to the case where the number of times the occupant rides the vehicle is equal to or more than 10 but less than 20) (case 2b), the display control unit 8A extends the time range A, the time range B, and the time range C from the initial settings.

When the degree of experience in automatic driving is low (for example, when the degree corresponds to the case where the number of times the occupant rides the vehicle is equal to or more than 0 but less than 10) (case 3b), the display control unit 8A extends the time range A, the time range B, and the time range C from the settings in the case 2b.

As a result, a vehicle situation that can occur at a later time range can be displayed on the display device which is easier to see from the occupant in the driver's seat, as the degree of experience of the occupant in the driver's seat in automatic driving decreases, and thus, display of information far in advance is enabled.

The display control unit 8A may extend each of the time range A, the time range B, and the time range C as the psychological state of the occupant in the driver's seat deteriorates.

For example, the display control unit 8A calculates the psychological state of the occupant in the driver's seat as a numerical value on the basis of the biological information (such as brain waves and pulse) of the occupant.

When the psychological state of the occupant in the driver's seat is within a comfortable range (for example, the value indicating the psychological state is greater than or equal to a threshold) (case 1c), the display control unit 8A keeps the initial settings of the time range A, the time range B, and the time range C.

When the psychological state of the occupant in the driver's seat is within a slightly uncomfortable range (for example, the value indicating the psychological state is less than the threshold) (case 2c), the display control unit 8A extends the time range A, the time range B, and the time range C from the initial settings.

When the psychological state of the occupant in the driver's seat is within an uncomfortable range (for example, the value indicating the psychological state is less than the value in the slightly uncomfortable range) (case 3c), the display control unit 8A extends the time range A, the time range B, and the time range C from the settings in the case 2c.

As a result, a vehicle situation that can occur at a later time range can be displayed on the display device which is easier to see from the occupant in the driver's seat, as the psychological state of the occupant in the driver's seat deteriorates, and thus, display of information far in advance is enabled.

The display control unit 8A may extend each of the time range A, the time range B, and the time range C as the degree of uneasiness of the occupant in the driver's seat increases.

For example, the display control unit 8A calculates the degree of uneasiness of the occupant in the driver's seat on the basis of the biological information (such as brain waves and pulse) of the occupant. When there is a plurality of occupants in the vehicle, the average value of the degrees of uneasiness of the occupants or the maximum value of the degree of uneasiness may be used as the degree of uneasiness of the occupant in the driver's seat.

When the degree of uneasiness of the occupant in the driver's seat is low (for example, the degree of uneasiness is less than a threshold) (case 1d), the display control unit 8A keeps the initial settings of the time range A, the time range B, and the time range C.

When the degree of uneasiness of the occupant in the driver's seat is medium (for example, the degree of uneasiness is greater than or equal to the threshold) (case 2d), the display control unit 8A extends the time range A, the time range B, and the time range C from the initial settings.

When the degree of uneasiness of the occupant in the driver's seat is high (for example, the degree of uneasiness is higher than the medium range) (case 3d), the display control unit 8A extends the time range A, the time range B, and the time range C from the settings in the case 2d.

As a result, a vehicle situation that can occur at a later time range can be displayed on the display device which is easier to see from the occupant in the driver's seat, as the degree of uneasiness of the occupant in the driver's seat increases, and thus, display of information far in advance is enabled.

The display control unit 8A may extend each of the time range A, the time range B, and the time range C as the accelerator operation amount of the vehicle increases.

When the accelerator operation amount is within a low range (an operation amount $\theta a$ is less than a threshold $\theta b$ and a threshold $\theta c$ ($\theta b < \theta c$)) (case 1e), the display control unit 8A keeps the initial settings of the time range A, the time range B, and the time range C.

When the accelerator operation amount is within a medium range (the operation amount $\theta b$ is greater than the threshold $\theta a$ but less than the threshold $\theta c$) (case 2e), the display control unit 8A extends the time range A, the time range B, and the time range C from the initial settings.

When the accelerator operation amount is within a high range (the operation amount $\theta c$ is greater than the threshold $\theta a$ and the threshold $\theta b$ ($\theta a < \theta b$)) (case 3e), the display control unit 8A extends the time range A, the time range B, and the time range C from the settings in the case 2e.

As a result, a vehicle situation that can occur at a later time range can be displayed on the display device which is easier to see from the occupant in the driver's seat, as the accelerator operation amount of the vehicle increases, and thus, display of information far in advance is enabled.

The display control unit 8A may extend each of the time range A, the time range B, and the time range C as the brake operation amount of the vehicle increases.

When the brake operation amount is within a low range (an operation amount $\theta a$ is less than a threshold $\theta b$ and a threshold $\theta c$ ($\theta b < \theta c$)) (case 1f), the display control unit 8A keeps the initial settings of the time range A, the time range B, and the time range C.

When the brake operation amount is within a medium range (the operation amount $\theta b$ is greater than the threshold $\theta a$ but less than the threshold $\theta c$) (case 2f), the display control unit 8A extends the time range A, the time range B, and the time range C from the initial settings.

When the brake operation amount is within a high range (the operation amount $\theta c$ is greater than the threshold $\theta a$ and the threshold $\theta b$ ($\theta a < \theta b$)) (case 3f), the display control unit 8A extends the time range A, the time range B, and the time range C from the settings in the case 2f.

As a result, a vehicle situation that can occur at a later time range can be displayed on the display device which is easier to see from the occupant in the driver's seat, as the brake operation amount of the vehicle increases, and thus, display of information far in advance is enabled.

The display control unit 8A may extend each of the time range A, the time range B, and the time range C as the age of the occupant is in the driver's seat is higher. For example, the display control unit 8A identifies the age of the occupant on the basis of the information about the occupant.

When the age of the occupant in the driver's seat is not in an old age range (for example, the age is under 65) (case 1g), the display control unit 8A keeps the initial settings of the time range A, the time range B, and the time range C.

When the age of the occupant in the driver's seat is in a young-old range (for example, between 65 and 75) (case 2g), the display control unit 8A extends the time range A, the time range B, and the time range C from the initial settings.

When the age of the occupant in the driver's seat is in an old-old range (for example, 75 or over) (case 3g), the display control unit 8A extends the time range A, the time range B, and the time range C from the settings in the case 2g.

As a result, a vehicle situation that can occur at a later time range can be displayed on the display device which is easier to see from the occupant in the driver's seat, as the age of the occupant in the driver's seat is higher, and thus, display of information far in advance is enabled.

The display control unit 8A may extend each of the time range A, the time range B, and the time range C as the age of the occupant is in the driver's seat is higher. For example, the display control unit 8A identifies the age of the occupant on the basis of the information about the occupant.

When the age of the occupant in the driver's seat is not in an old age range (for example, the age is under 65) (case 1h), the display control unit 8A keeps the initial settings of the time range A, the time range B, and the time range C.

When the age of the occupant in the driver's seat is in a young-old range (for example, between 65 and 75) (case 2h), the display control unit 8A extends the time range A, the time range B, and the time range C from the initial settings.

When the age of the occupant in the driver's seat is in an old-old range (for example, 75 or over) (case 3h), the display control unit 8A extends the time range A, the time range B, and the time range C from the settings in the case 2h.

As a result, a vehicle situation that can occur at a later time range can be displayed on the display device which is easier to see from the occupant in the driver's seat, as the age of the occupant in the driver's seat is higher, and thus, display of information far in advance is enabled.

The display control unit 8A may extend each of the time range A, the time range B, and the time range C as the eyesight or hearing of the occupant in the driver's seat decreases. For example, the display control unit 8A identifies the eyesight or hearing of the occupant on the basis of the information about the occupant.

When the eyesight of the occupant in the driver's seat is within a normal range (for example, the eyesight is equal to or more than 0.7) (case 1i), the display control unit 8A keeps the initial settings of the time range A, the time range B, and the time range C.

When the eyesight of the occupant in the driver's seat is slightly poor (for example, the eyesight is equal to or more than 0.3 but less than 0.7) (case 2i), the display control unit 8A extends the time range A, the time range B, and the time range C from the initial settings.

When the eyesight of the occupant in the driver's seat is poor (for example, the eyesight is less than 0.3) (case 3i), the display control unit 8A extends the time range A, the time range B, and the time range C from the settings in the case 2i. The eyesight may be replaced with hearing.

As a result, a vehicle situation that can occur at a later time range can be displayed on the display device which is easier to see from the occupant in the driver's seat, as the eyesight of the occupant in the driver's seat decreases, and thus, display of information far in advance is enabled.

The display control unit 8A may extend each of the time range A, the time range B, and the time range C as the set inter-vehicle distance increases. For example, the display control unit 8A identifies the set inter-vehicle distance on the basis of the setting information for automatic driving. The set inter-vehicle distance may be selected, as appropriate, from a plurality of values by the occupant.

When the set inter-vehicle distance is short (for example, the set inter-vehicle distance of the vehicle traveling at 40 km/h is less than 20 m) (case 1j), the display control unit 8A keeps the initial settings of the time range A, the time range B, and the time range C.

When the set inter-vehicle distance is medium (for example, the set inter-vehicle distance of the vehicle traveling at 40 km/h is equal to or more than 20 m and less than 25 m) (case 2j), the display control unit 8A extends the time range A, the time range B, and the time range C from the initial settings.

When the set inter-vehicle distance is long (for example, the set inter-vehicle distance of the vehicle traveling at 40 km/h is equal to or more than 25 m) (case 3j), the display control unit 8A extends the time range A, the time range B, and the time range C from the settings in the case 2j.

As a result, a vehicle situation that can occur at a later time range can be displayed on the display device which is easier to see from the occupant in the driver's seat, as the set inter-vehicle distance increases, and thus, display of information far in advance is enabled.

During the manual driving, it is better to display information farther in advance than during the automatic driving.

In addition, since it is predicted that the occupant is not used to the behavior of the automatic driving vehicle until a certain period of time has elapsed after the start of the automatic driving, it is better to display the information far in advance.

At the timing at which the automatic driving is switched to the manual driving, the driver needs to focus on the driving, and therefore, it is better to display information farther in advance.

In view of this, when the driving mode of the vehicle is the manual driving mode, the display control unit 8A further extends the time range so that a vehicle situation that can occur at a later time is included, compared with the automatic driving mode.

For example, when the driving mode is the automatic driving mode and a travel route is set in the vehicle (case 1k), the display control unit 8A keeps the initial settings of the time range A, the time range B, and the time range C.

When the automatic driving mode is set and the travel route is not set (case 2k), the display control unit 8A extends the time range A, the time range B, and the time range C from the initial settings.

When the driving mode is the manual driving mode (case 3k), the display control unit 8A extends the time range A, the time range B, and the time range C from the settings in the case 2k.

Furthermore, at the timing at which the driving mode is switched from the automatic driving mode to the manual driving mode, the display control unit 8A extends the time range A, the time range B, and the time range C from the settings in the case 3k.

As a result, a vehicle situation that can occur at a much later time range can be displayed on the display device which is easier to see from the occupant in the driver's seat, depending on the vehicle driving mode, and thus, display of information far in advance is enabled.

Figure 12:
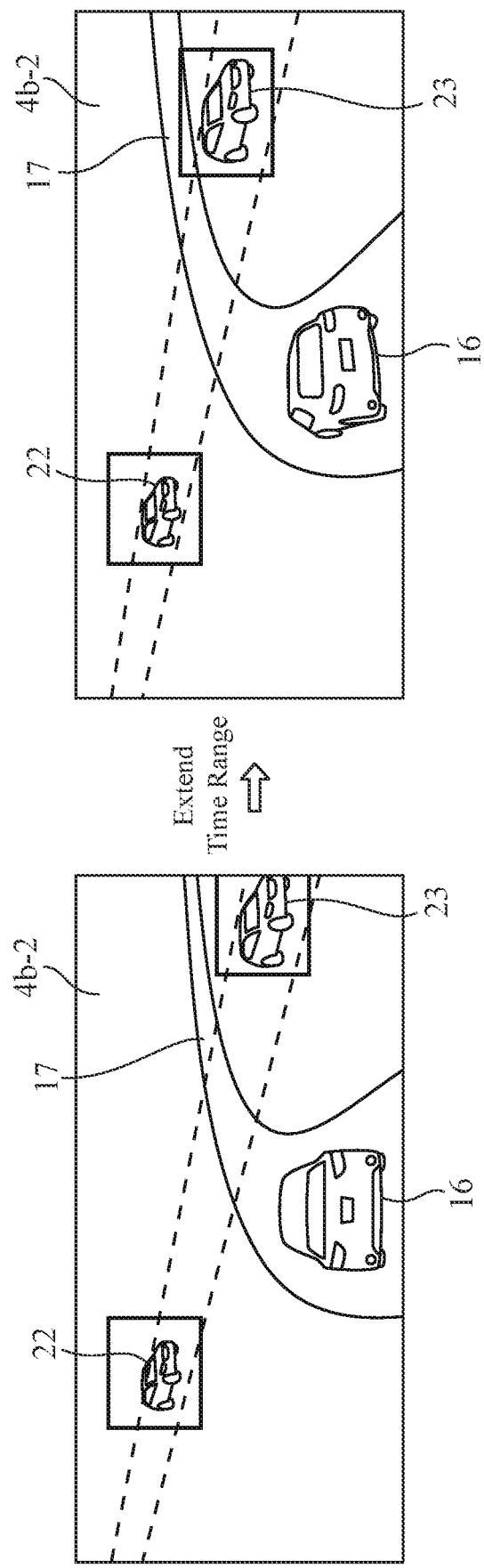
FIG. 12 is a view showing a process of changing an angle of view of the second display device.

FIG. 12 is a view showing a process of changing an angle of view of the second display device 4b. In FIG. 12, an icon 16 indicates a vehicle equipped with the display system 3A. A route display 17 indicates the travel route of the vehicle indicated by the icon 16. An icon 22 indicates an oncoming vehicle approaching the route display 17, and an icon 23 indicates an oncoming vehicle that has passed the route display 17. The screen of the monitor 4b-2 on the left side of FIG. 12 shows the display state before the time range B is extended, and the screen of the monitor 4b-2 on the right side of FIG. 12 shows the display state after the time range B is extended.

The display control unit 8A extends each of the time range A, the time range B, and the time range C as the traveling speed of the vehicle indicated by the icon 16 increases. When extended, the time range B includes a vehicle situation that can occur at a later time.

Then, the display control unit 8A adjusts the display area of the second display device 4b so that the vehicle situation that can occur at a later time is displayed.

For example, the display control unit 8A changes the angle of view so that the vehicle situation included in the extended time range B is displayed.

In the vehicle situation in the time range B before extension, the icon 23 is displayed at the end of the screen as shown on the screen of the monitor 4b-2 on the left side of FIG. 12.

In other words, a situation after the oncoming vehicle indicated by the icon 23 has passed the travel route indicated by the route display 17 cannot be displayed on the screen of the monitor 4b-2.

The extended time range B includes a vehicle situation that can occur at a later time.

Therefore, the display control unit 8A shifts the angle of view on the screen of the monitor 4b-2 shown on the left side of FIG. 12 to the left so that the vehicle situation that can occur at a later time is displayed. With this, the display state of the screen of the monitor 4b-2 shown on the right side of FIG. 12 is obtained.

Thus, the icon 23 is displayed further inward on the screen of the monitor 4b-2 shown on the right side of FIG. 12 than on the screen shown on the left side of FIG. 12, and the situation after the oncoming vehicle indicated by the icon 23 has passed the travel route indicated by the route display 17 can also be displayed. That is, the second display device 4b has a wide display area in terms of time.

In the display state of the screen of the monitor 4b-2 shown on the right side of FIG. 12, when the traveling speed of the vehicle indicated by the icon 16 falls in the low speed range, the display control unit 8A returns the time range A, the time range B, and the time range C to the ranges before extension.

Then, the display control unit 8A returns the display state to the display state of the screen shown on the left side of FIG. 12 by shifting the angle of view of the display area to the left so that the vehicle situation in the time range before extension is displayed.

That is, the second display device 4b has a narrow display area in terms of time.

The display control unit 8A may also extend the time range A, the time range B, and the time range C so that, when the vehicle is turning right or left, a vehicle situation that can occur at a later time in the direction in which the vehicle is turning is included.

For example, the display control unit 8A extends each of the time range A, the time range B, and the time range C when the vehicle is turning right, and adjusts the display area of the display device so that the situation regarding the right-turn direction of the vehicle in the extended time range is displayed.

Examples of the method for adjusting the display area include shifting the angle of view of the display content to the right or shifting the center position of the display content to the left. This enables the display of the situation in the direction in which the vehicle is turning in a wide display area in terms of time, and can warn the occupant in the driver's seat.

As described above, in the display system 3A according to the second embodiment, the display control unit 8A extends each of the time range A, the time range B, and the time range C on the basis of the information acquired by the information acquisition unit 6 so that a vehicle situation that can occur at a later time is included, and controls the display content of the first display device 4a, the second display device 4b, and the third display device 4c. With this configuration, a vehicle situation that can occur at a later time range can be displayed on the display device which is easier to see from the occupant in the driver's seat, and thus, display of information far in advance is enabled.

Further, in the display system 3A according to the second embodiment, the display control unit 8A changes the angle of view so that the vehicle situation included in the extended time range is displayed.

With this configuration, it is possible to display a vehicle situation that can occur at a later time without performing complicated image processing.

Furthermore, in the display system 3A according to the second embodiment, the display control unit 8A extends each of the time range A, the time range B, and the time range C so that, when the vehicle is turning right or left, a vehicle situation that can occur at a later time in the direction in which the vehicle is turning is included, and adjusts displays of the display devices so that the vehicle situation in the extended time range is displayed.

This enables the display of the situation in the direction in which the vehicle is turning in a wide display area in terms of time, and can warn the occupant in the driver's seat.

Further, in the display system 3A according to the second embodiment, the display control unit 8A extends each of the time range A, the time range B, and the time range C on the basis of the information about the vehicle state acquired by the information acquisition unit 6 so that a vehicle situation that can occur at a later time is included. In particular, the information about the vehicle state is at least one of an increase in the vehicle speed, an increase in the accelerator operation amount, an increase in the brake operation amount, and a decrease in the set inter-vehicle distance.

With this configuration, a vehicle situation that can occur at a later time range can be displayed on the display device which is easier to see from the occupant in the driver's seat, and thus, display of information far in advance is enabled.

Further, in the display system 3A according to the second embodiment, the display control unit 8A extends each of the time range A, the time range B, and the time range C on the basis of the information about the occupant in the driver's seat acquired by the information acquisition unit 6 so that a vehicle situation that can occur at a later time is included. In particular, the information about the occupant in the driver's seat is at least one of a decrease in the degree of attention of the occupant in the driver's seat to the front; a decrease in the degree of experience of the occupant in the driver's seat in automatic driving; deterioration in the psychological state of the occupant in the driver's seat; an increase in the degree of uneasiness of the occupant in the driver's seat; an increase in the age of the occupant in the driver's seat; and a decrease in the eyesight or hearing of the occupant in the driver's seat.

With this configuration, a vehicle situation that can occur at a later time range can be displayed on the display device which is easier to see from the occupant in the driver's seat, and thus, display of information far in advance is enabled.

Further, in the display system 3A according to the second embodiment, the display control unit 8A extends each of the time range A, the time range B, and the time range C on the basis of the driving mode of the vehicle acquired by the information acquisition unit 6 so that a vehicle situation that can occur at a later time is included. In particular, when the driving mode of the vehicle is the manual driving mode, the time range is further extended so that a vehicle situation that can occur at a later time is included, compared with the automatic driving mode. In addition, at the timing at which the driving mode of the vehicle is switched from the automatic driving mode to the manual driving mode, the time range is further extended so that a vehicle situation that can occur at a later time is included. With this configuration, a vehicle situation that can occur at a later time range can be displayed on the display device which is easier to see from the occupant in the driver's seat, and thus, display of information far in advance is enabled.

Third Embodiment

Figure 13:
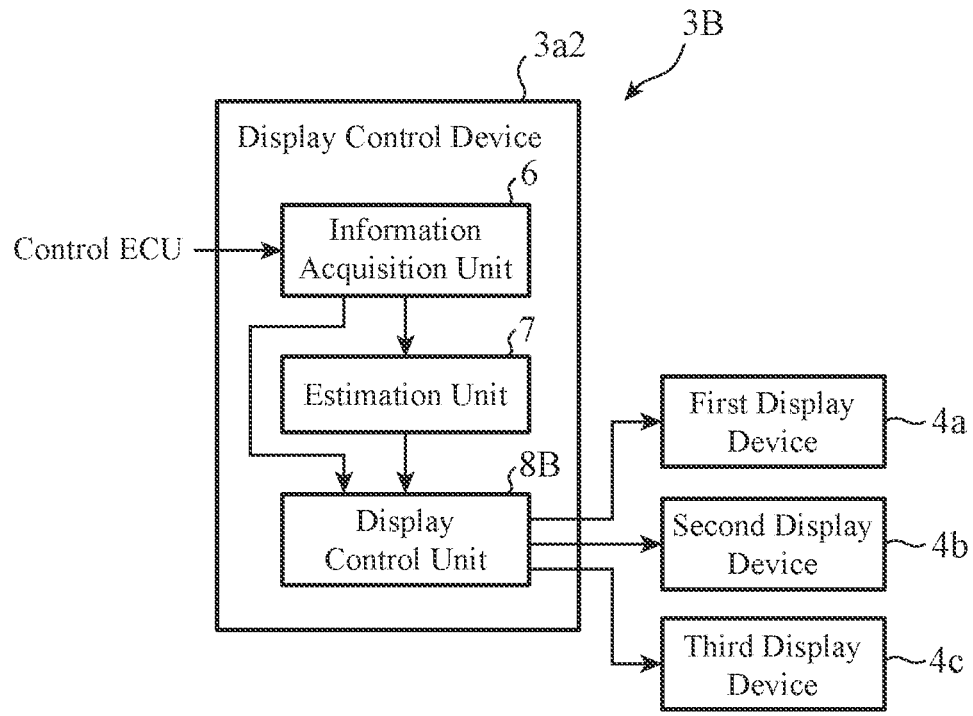
FIG. 13 is a block diagram showing a functional configuration of a display system according to a third embodiment of the present invention.

FIG. 13 is a block diagram showing a functional configuration of a display system 3B according to a third embodiment. In FIG. 13, the same components as those in FIG. 3 are identified by the same reference signs, and the description thereof will be omitted.

A display control device 3a2 includes an information acquisition unit 6, an estimation unit 7, and a display control unit 8B.

The display control unit 8B extends each of the time range A, the time range B, and the time range C on the basis of the information about a situation outside the vehicle acquired by the information acquisition unit 6 so that a vehicle situation that can occur at a later time is included.

Next, the operation will be described.

Figure 14:
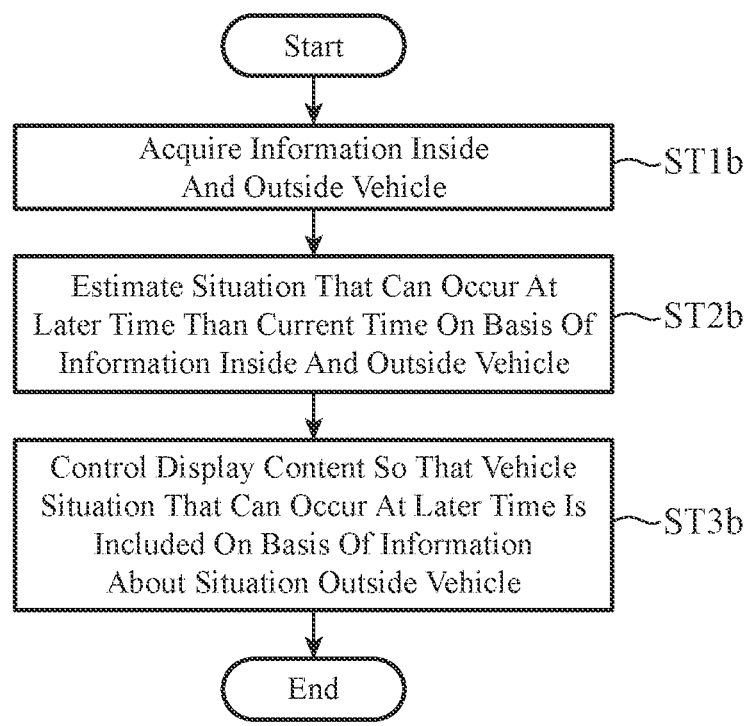
FIG. 14 is a flowchart showing a display method according to the third embodiment.

FIG. 14 is a flowchart showing a display method according to the third embodiment. FIG. 14 is a series of processes after information inside and outside the vehicle is acquired until the information is displayed in the first display device 4a, the second display device 4b, and the third display device 4c. Note that processes in step ST1b and step ST2b in FIG. 14 are the same as those in step ST1 and step ST2 in FIG. 5, so that the description thereof will be omitted.

In step ST3b, the display control unit 8B displays a vehicle situation in the first display device 4a, the second display device 4b, and the third display device 4c, and controls display content in such a manner that the display content includes a vehicle situation that can occur at a later time on the basis of the information about the situation outside the vehicle acquired by the information acquisition unit 6.

Specifically, the display control unit 8B controls the display content in such a manner that the display content of the second display device 4b includes a vehicle situation that can occur at a later time than the vehicle situation displayed on the first display device 4a, and the display content of the third display device 4c includes a vehicle situation that can occur at a later time than the vehicle situation displayed on the second display device 4b.

In particular, the display control unit 8B extends each of the time range A, the time range B, and the time range C on the basis of the information about the situation outside the vehicle, and controls the display content of the first display device 4a, the second display device 4b, and the third display device 4c.

The information about the vehicle situation is, for example, at least one of the weather in a travel area of the vehicle, the friction coefficient of the road surface on which the vehicle is traveling, the brightness of the travel area of the vehicle, the number of objects detected around the vehicle, the visibility in the travel area of the vehicle, the number of objects expected to be in the view of the occupant in the driver's seat, the degree of congestion of the travel path of the vehicle, the speed limit of the travel path of the vehicle, and the presence of an obstruction that obstructs the view in the traveling direction of the vehicle.

The display control unit 8B may extend each of the time range A, the time range B, and the time range C depending on the weather of the travel area of the vehicle. For example, the display control unit 8B extends the time ranges depending on the rainfall amount in the travel area of the vehicle.

When the travel area of the vehicle is sunny and the rainfall amount is 0 (case 1l), the display control unit 8B keeps the initial settings of the time range A, the time range B, and the time range C.

When the rainfall amount in the travel area of the vehicle is low (for example, the rainfall amount is less than a threshold) (case 2l), the display control unit 8B extends the time range A, the time range B, and the time range C from the initial settings.

When the rainfall amount in the travel area of the vehicle is high (for example, the rainfall amount is equal to or greater than the threshold) (case 3l), the display control unit 8B extends the time range A, the time range B, and the time range C from the settings in the case 2l.

As a result, a vehicle situation that can occur at a later time range can be displayed on the display device which is easier to see from the occupant in the driver's seat, as the rainfall amount in the travel area of the vehicle increases, and thus, display of information far in advance is enabled.

The display control unit 8B may extend each of the time range A, the time range B, and the time range C depending on the friction coefficient of the road surface on which the vehicle is traveling.

When the friction coefficient of the road surface on which the vehicle is traveling is high (for example, the friction coefficient $\mu b$ is greater than a threshold $\mu b$ and a threshold $\mu c$ ($\mu b > \mu c$) (case 1m), the display control unit 8B keeps the initial settings of the time range A, the time range B, and the time range C.

When the friction coefficient of the road surface on which the vehicle is traveling is medium (for example, the friction coefficient $\mu a$ is less than a threshold pa and greater than the threshold $\mu c$) (case 2m), the display control unit 8B extends the time range A, the time range B, and the time range C from the initial settings.

When the friction coefficient of the road surface on which the vehicle is traveling is low (for example, the friction coefficient $\mu c$ is less than the threshold pa and the threshold $\mu b$) (case 3m), the display control unit 8B extends the time range A, the time range B, and the time range C from the settings in the case 2m.

As a result, a vehicle situation that can occur at a later time range can be displayed on the display device which is easier to see from the occupant in the driver's seat, as the friction coefficient of the road on which the vehicle is traveling decreases, and thus, display of information far in advance is enabled.

The display control unit 8B may extend each of the time range A, the time range B, and the time range C depending on the brightness of the travel area of the vehicle.

When the brightness of the travel area of the vehicle is high (for example, equal to or more than 3000 lx) (case 1n), the display control unit 8B keeps the initial settings of the time range A, the time range B, and the time range C.

When the brightness of the travel area of the vehicle is medium (for example, equal to or more than 200 lx and less than 3000 lx) (case 2n), the display control unit 8B extends the time range A, the time range B, and the time range C from the initial settings.

When the brightness of the travel area of the vehicle is low (for example, less than 200 lx) (case 3n), the display control unit 8B extends the time range A, the time range B, and the time range C from the settings in the case 2n.

As a result, a vehicle situation that can occur at a later time range can be displayed on the display device which is easier to see from the occupant in the driver's seat, as it gets darker in the travel area of the vehicle, and thus, display of information far in advance is enabled.

The display control unit 8B may extend each of the time range A, the time range B, and the time range C depending on the number of objects detected around the vehicle. Examples of the object include a pedestrian and a vehicle.

When the number of objects detected around the vehicle is small (for example, the number A of objects is less than a threshold B and a threshold C) (case 1o), the display control unit 8B keeps the initial settings of the time range A, the time range B, and the time range C.

When the number of objects detected around the vehicle is medium (for example, the number A of objects is greater than the threshold B and less than the threshold C (B<C)) (case 2o), the display control unit 8B extends the time range A, the time range B, and the time range C from the initial settings.

When the number of objects detected around the vehicle is great (for example, the number A of objects is greater than the threshold B and the threshold C) (case 3o), the display control unit 8B extends the time range A, the time range B, and the time range C from the settings in the case 2o.

As a result, a vehicle situation that can occur at a later time range can be displayed on the display device which is easier to see from the occupant in the driver's seat, as the number of objects detected around the vehicle increases, and thus, display of information far in advance is enabled.

The display control unit 8B may extend each of the time range A, the time range B, and the time range C depending on the visibility in the travel area of the vehicle. For example, when fog rises in the travel area, the display control unit 8B calculates the visibility on the basis of imaging information of an area in front of the vehicle.

When the visibility in the travel area of the vehicle is great (for example, visibility of equal to or more than 1 km) (case 1p), the display control unit 8B keeps the initial settings of the time range A, the time range B, and the time range C.

When the visibility in the travel area of the vehicle is medium (for example, visibility of equal to or more than 100 m less than 1 km) (case 2p), the display control unit 8B extends the time range A, the time range B, and the time range C from the initial settings.

When the visibility in the travel area of the vehicle is low (for example, visibility of less than 100 m) (case 3p), the display control unit 8B extends the time range A, the time range B, and the time range C from the settings in the case 2p.

As a result, a vehicle situation that can occur at a later time range can be displayed on the display device which is easier to see from the occupant in the driver's seat, as the visibility in the travel area of the vehicle decreases, and thus, display of information far in advance is enabled.

The display control unit 8B may extend each of the time range A, the time range B, and the time range C depending on the number of objects that are expected to be in the view of the occupant in the driver's seat.

For example, the display control unit 8B groups the number of objects expected to be in the view of the occupant in the driver's seat on the basis of an area where the vehicle is traveling.

When the number of objects expected to be in the view of the occupant in the driver's seat is small (for example, when the vehicle is traveling on a flat road or a private road with a good view) (case 1q), the display control unit 8B keeps the initial settings of the time range A, the time range B, and the time range C.

When the number of objects expected to be in the view of the occupant in the driver's seat is medium (for example, when the vehicle is traveling along a country road) (case 2q), the display control unit 8B extends the time range A, the time range B, and the time range C from the initial settings.

When the number of objects expected to be in the view of the occupant in the driver's seat is great (for example, when the vehicle is traveling in a large city) (case 3q), the display control unit 8B extends the time range A, the time range B, and the time range C from the settings in the case 2q.

As a result, a vehicle situation that can occur at a later time range can be displayed on the display device which is easier to see from the occupant in the driver's seat, as the number of objects expected to be in the view of the occupant in the driver's seat increases, and thus, display of information far in advance is enabled.

The display control unit 8B may expand each of the time range A, the time range B, and the time range C depending on the degree of congestion on the travel path of the vehicle.

For example, the display control unit 8B calculates the degree of congestion on the travel path of the vehicle on the basis of the number of vehicles existing around the vehicle.

When the degree of congestion on the travel path of the vehicle is low (for example, the degree of congestion on the travel path is less than 1.00) (case 1r), the display control unit 8B keeps the initial settings of the time range A, the time range B, and the time range C.

When the degree of congestion on the travel path of the vehicle is medium (for example, the degree of congestion on the travel path is equal to or more than 1.00 and less than 1.75) (case 2r), the display control unit 8B extends the time range A, the time range B, and the time range C from the initial settings.

When the degree of congestion on the travel path of the vehicle is high (for example, the degree of congestion on the travel path is equal to or more than 1.75) (case 3r), the display control unit 8B extends the time range A, the time range B, and the time range C from the settings in the case 2r.

As a result, a vehicle situation that can occur at a later time range can be displayed on the display device which is easier to see from the occupant in the driver's seat, as the degree of congestion on the travel path of the vehicle increases, and thus, display of information far in advance is enabled.

The display control unit 8B may extend each of the time range A, the time range B, and the time range C depending on the speed limit of the travel path of the vehicle.

When the vehicle is traveling on a general road, the display control unit 8B keeps the initial settings of the time range A, the time range B, and the time range C.

When the vehicle is traveling on an expressway, the display control unit 8B extends the time range A, the time range B, and the time range C from the initial settings.

As a result, a vehicle situation that can occur at a later time range can be displayed on the display device which is easier to see from the occupant in the driver's seat, when the vehicle is traveling on an expressway, and thus, display of information far in advance is enabled.

The display control unit 8B may extend each of the time range A, the time range B, and the time range C depending on the presence of an obstruction that obstructs the view in the traveling direction of the vehicle. Examples of the obstruction that obstructs the view in the traveling direction of the vehicle include a tunnel.

When there is no obstruction that obstructs the view in the traveling direction of the vehicle, the display control unit 8B keeps the initial settings of the time range A, the time range B, and the time range C.

When there is an obstruction that obstructs the view in the traveling direction of the vehicle, the display control unit 8B extends the time range A, the time range B, and the time range C from the initial settings.

For example, when there is a merging point in an area beyond the tunnel, the merging point cannot be seen by the occupant in the vehicle. For this reason, the vehicle driving in the automatic driving mode may suddenly merge while the occupant in the vehicle does not notice the merging. In this case, the occupant feels uneasy about whether the automatic driving is functioning normally. In view of this, in the third embodiment, when there is a tunnel that obstructs the view in the traveling direction of the vehicle, a vehicle situation that can occur in a later time range is displayed on the display device. As a result, the occupant in the vehicle can find that there is a merging point in an area beyond the tunnel, and thus, does not feel uneasy about whether the automatic driving is functioning normally.

When either the left side or the right side of the vehicle is obstructed, the display control unit 8B may extend each of the time range A, the time range B, and the time range C so that a vehicle situation that can occur at a later time in the direction on the obstructed side is included. The display control unit 8B adjusts the display of the display device so that the vehicle situation in the extended time range is displayed.

This enables the display of the situation in the direction in which the occupant's view is obstructed in a wide display area in terms of time, and can warn the occupant in the driver's seat.

The display control unit 8B may extend each of the time range A, the time range B, and the time range C depending on the combination of the abovementioned information about the situation outside the vehicle.

For example, when it is raining while the vehicle is traveling on an expressway, the time range is accordingly extended.

When the vehicle is traveling on a general road (case 1s), the display control unit 8B keeps the initial settings of the time range A, the time range B, and the time range C.

When the vehicle is traveling on an expressway and the rainfall amount is 0 (case 2s), the display control unit 8B extends the time range A, the time range B, and the time range C from the initial settings.

When the vehicle is traveling on an expressway and the rainfall amount is large (case 3s), the display control unit 8B extends the time range A, the time range B, and the time range C from the settings in the case 2s.

As described above, in the display system 3B according to the third embodiment, the display control unit 8B extends each of the time range A, the time range B, and the time range C on the basis of the information about a situation outside the vehicle acquired by the information acquisition unit 6 so that a vehicle situation that can occur at a later time is included, and controls the display content of the first display device 4a, the second display device 4b, and the third display device 4c.

In particular, the information about the situation outside the vehicle is at least any one of: deterioration in the weather in the travel area of the vehicle; a decrease in the friction coefficient of the road surface on which the vehicle is traveling; a decrease in the brightness of the travel area; an increase in the number of objects detected around the vehicle; a decrease in the visibility in the travel area; an increase in the number of objects expected to be in the view of the occupant in the driver's seat; an increase in congestion of the travel path; an increase in the speed limit of the travel path; and the presence of an obstruction that obstructs a distant view in the traveling direction of the vehicle.

With this configuration, a vehicle situation that can occur at a later time range can also be displayed on the display device which is easier to see from the occupant in the driver's seat. As a result, display of information far in advance is enabled.

The first to third embodiments show the configuration in which each of the display systems 3, 3A, and 3B is provided with the first display device 4a, the second display device 4b, and the third display device 4c. However, each of the display systems may have two display devices, or four or more display devices.

In this case, the display systems 3, 3A, and 3B perform control so that the display device farther from the gaze of the occupant in the driver's seat while the vehicle is traveling displays a display content including a vehicle situation that can occur at a later time (farther in the future).

For example, when the display system shown in each of the above embodiments includes the first display device and the second display device, the display control unit controls display content so that the display content of the second display device includes a vehicle situation that can occur at a later time than the vehicle situation displayed on the first display device.

Further, when the display system shown in each of the above embodiments includes first to fourth display devices, the display control unit controls display content so that the display content of the second display device includes a vehicle situation that can occur at a later time than the vehicle situation displayed on the first display device, the display content of the third display device includes a vehicle situation that can occur at a later time than the vehicle situation displayed on the second display device, and the display content of the fourth display device includes a vehicle situation that can occur at a later time than the vehicle situation displayed on the third display device.

With this configuration, the effects described in the first to third embodiments can also be obtained.

The present invention is not limited to the above embodiments, and two or more of the above embodiments can be freely combined, or arbitrary components in the respective embodiments can be modified or omitted, within the scope of the present invention.

INDUSTRIAL APPLICABILITY

The display system according to the present invention enables an occupant to accurately recognize a vehicle situation in a visual manner, and thus, can be used, for example, to notify the occupant of the vehicle situation in automatic driving.

REFERENCE SIGNS LIST

1: sensor group, 1a: vehicle speed sensor, 1b: steering angle sensor, 1c: accelerator sensor, 1d: brake sensor, 1e: shift sensor, 1f: blinker sensor, 1g: in-vehicle camera, 1h: biological sensor, 1i: acceleration sensor, 1j: angular velocity sensor, 1k: GPS device, 1l: external camera, 1m: external sensor, 2: control ECU, 2a, 30: processor, 2b, 31: ROM, 2c, 32: RAM, 2d: navigation system, 2e: engine, 2f: transmission, 2g: brake actuator, 2h: steering actuator, 2i: blinker, 3, 3A, 3B: display system, 3a, 3a1, 3a2: display control device, 4a: first display device, 4a-1, 4b-1, 4c-1: monitor driver, 4a-2, 4b-2, 4c-2: monitor, 4b: second display device, 4c: third display device, 5: wireless communication device, 5a: antenna, 5b: transmission unit, 5c: reception unit, 6: information acquisition unit, 7: estimation unit, 8, 8A, 8B: display control unit, 10, 12, 13, 15: mark, 11: numerical information, 14, 14a, 16, 19 to 23: icon, 17: route display, 18: intersection image

The invention claimed is:

1. A display system comprising:
a plurality of display devices provided in a vehicle interior;
a processor; and
a memory storing instructions which, when executed by the processor, causes the processor to perform processes of:
acquiring information inside and outside a vehicle;
estimating a vehicle situation that is likely to occur at a later time from a current time on a basis of the acquired information;
displaying the estimated vehicle situation on a first display device and a second display device included in the plurality of display devices, and controlling display content in such a manner that display content of the second display device includes a vehicle situation that is likely to occur at a later time with respect to the vehicle situation displayed on the first display device, and
displaying the estimated vehicle situation on a third display device included in the plurality of display devices, and controlling the display content in such a manner that display content of the third display device includes a vehicle situation that is likely to occur at a later time with respect to the vehicle situation displayed on the second display device.

2. The display system according to claim 1,
wherein the first display device is provided at a position closer to a gaze of an occupant in a driver's seat while the vehicle is traveling than the second display device.

3. The display system according to claim 1,
wherein the second display device is provided at a position closer to a gaze of an occupant in a driver's seat while the vehicle is traveling than the third display device.

4. The display system according to claim 1,
wherein the processor controls the display content in such a manner that a vehicle situation that is likely to occur at a later time is included on a basis of the acquired information.

5. The display system according to claim 4,
wherein the processor changes a display angle of view so as to include a vehicle situation that is likely to occur at a later time.

6. The display system according to claim 1,
wherein the processor controls the display content in such a manner that, when the vehicle turns right or left, a vehicle situation that is likely to occur at a later time in a direction in which the vehicle turns is included.

7. The display system according to claim 4,
wherein the processor controls the display content in such a manner that a vehicle situation that is likely to occur at a later time is included on a basis of acquired information about a vehicle state.

8. The display system according to claim 7,
wherein the information about the vehicle state includes at least one of a vehicle speed, an accelerator operation amount, a brake operation amount, and a set inter-vehicle distance.

9. The display system according to claim 4,
wherein the processor controls the display content in such a manner that a vehicle situation that is likely to occur at a later time is included on a basis of acquired information about an occupant in a driver's seat.

10. The display system according to claim 9,
wherein the information about the occupant in the driver's seat includes at least one of a degree of attention of the occupant in the driver's seat to front, a degree of experience of the occupant in the driver's seat in automatic driving, a psychological state of the occupant in the driver's seat, a degree of uneasiness of the occupant in the driver's seat, an age of the occupant in the driver's seat, and an eyesight or hearing of the occupant in the driver's seat.

11. The display system according to claim 4,
wherein the processor controls the display content of the plurality of display devices on a basis of an acquired vehicle driving mode.

12. The display system according to claim 11,
wherein the processor controls the display content of the plurality of display devices in such a manner that, when the vehicle driving mode is a manual driving mode, a vehicle situation that is likely to occur at a later time is included, compared with an automatic driving mode.

13. The display system according to claim 11,
wherein the processor controls the display content in such a manner that, at a timing at which the vehicle driving mode is switched from the automatic driving mode to the manual driving mode, a vehicle situation that is likely to occur at a later time is included.

14. The display system according to claim 4,
wherein the processor controls the display content in such a manner that a vehicle situation that is likely to occur at a later time is included on a basis of acquired information about a situation outside the vehicle.

15. The display system according to claim 14,
wherein the information about the situation outside the vehicle includes at least one of weather in a travel area of the vehicle, a friction coefficient of a road surface on which the vehicle is traveling, brightness of the travel area of the vehicle, a number of objects detected around the vehicle, visibility in the travel area of the vehicle, a number of objects expected to be in a view of an occupant in a driver's seat, a degree of congestion of a travel path of the vehicle, a speed limit of the travel path of the vehicle, and presence of an obstruction that obstructs the view in a traveling direction of the vehicle.

16. A display method comprising:
acquiring information inside and outside a vehicle;
estimating a vehicle situation that is likely to occur at a later time from a current time on a basis of the acquired information;
displaying the estimated vehicle situation on a first display device and a second display device included in a plurality of display devices, and controlling display content in such a manner that display content of the second display device includes a vehicle situation that is likely, to occur at a later time with respect to the vehicle situation displayed on the first display device, and
displaying the estimated vehicle situation on a third display device included in the plurality of display devices, and controlling the display content in such a manner that display content of the third display device includes a vehicle situation that is likely to occur at a later time with respect to the vehicle situation displayed on the second display device.

* * * * *